(12) United States Patent
Koros et al.

(10) Patent No.: US 10,500,548 B2
(45) Date of Patent: Dec. 10, 2019

(54) COMPOSITE NANOPARTICLE STABILIZED CORE CARBON MOLECULAR SIEVE HOLLOW FIBER MEMBRANES HAVING IMPROVED PERMEANCE

(71) Applicant: Georgia Tech Research Corporation, Atlanta, GA (US)

(72) Inventors: William John Koros, Atlanta, GA (US); Kuang Zhang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 253 days.

(21) Appl. No.: 15/512,100

(22) PCT Filed: Aug. 14, 2015

(86) PCT No.: PCT/US2015/045394
§ 371 (c)(1),
(2) Date: Mar. 17, 2017

(87) PCT Pub. No.: WO2016/048479
PCT Pub. Date: Mar. 31, 2016

(65) Prior Publication Data
US 2017/0274327 A1  Sep. 28, 2017

Related U.S. Application Data

(60) Provisional application No. 62/053,464, filed on Sep. 22, 2014, provisional application No. 62/066,625, (Continued)

(51) Int. Cl.
*B01D 53/22* (2006.01)
*B01D 69/08* (2006.01)
(Continued)

(52) U.S. Cl.
CPC .......... *B01D 69/08* (2013.01); *B01D 53/228* (2013.01); *B01D 67/0067* (2013.01);
(Continued)

(58) Field of Classification Search
CPC .......... B01D 67/0079; B01D 2257/504; B01D 2256/12; B01D 71/02; B01D 71/021;
(Continued)

(56) References Cited

U.S. PATENT DOCUMENTS

| 4,467,001 A | 8/1984 | Coplan et al. |
| 5,599,380 A | 2/1997 | Koros |

(Continued)

FOREIGN PATENT DOCUMENTS

WO   2015183831   12/2015

OTHER PUBLICATIONS

Carruthers et al., "Morphology of Integral-Skin Layers in Hollow-Fiber Gas-Separation Membranes", Journal of Applied Polymer Science, vol. 90, No. 2, 2003, pp. 399-411.
(Continued)

*Primary Examiner* — Anthony R Shumate
(74) *Attorney, Agent, or Firm* — Kilpatrick Townsend & Stockton LLP

(57) ABSTRACT

Disclosed herein are asymmetric multilayer carbon molecular sieve ("CMS") hollow fiber membranes and processes for preparing the membranes. The processes include simultaneously extruding a core dope containing a polymer and suitable nanoparticles, a sheath dope, and a bore fluid, followed by pyrolysis of the extruded fiber.

20 Claims, 12 Drawing Sheets

Related U.S. Application Data filed on Oct. 21, 2014, provisional application No. 62/067,699, filed on Oct. 23, 2014, provisional application No. 62/074,197, filed on Nov. 3, 2014.

(51) Int. Cl.

| | | |
|---|---|---|
| *B01D 67/00* | (2006.01) | |
| *B01D 69/12* | (2006.01) | |
| *B01D 69/14* | (2006.01) | |
| *B01D 71/02* | (2006.01) | |

(52) U.S. Cl.
CPC ....... *B01D 67/0079* (2013.01); *B01D 69/088* (2013.01); *B01D 69/12* (2013.01); *B01D 69/141* (2013.01); *B01D 71/021* (2013.01); *B01D 67/0076* (2013.01); *B01D 69/148* (2013.01); *B01D 71/02* (2013.01); *B01D 71/025* (2013.01); *B01D 71/027* (2013.01); *B01D 2256/12* (2013.01); *B01D 2256/16* (2013.01); *B01D 2256/24* (2013.01); *B01D 2256/245* (2013.01); *B01D 2257/102* (2013.01); *B01D 2257/304* (2013.01); *B01D 2257/504* (2013.01); *B01D 2257/7022* (2013.01); *B01D 2323/18* (2013.01); *B01D 2325/022* (2013.01); *B01D 2325/32* (2013.01); *Y02C 10/10* (2013.01)

(58) Field of Classification Search
CPC .............. B01D 71/025; B01D 2256/16; B01D 67/0067; B01D 2257/7022; B01D 2257/304; B01D 69/08; B01D 2325/022; B01D 69/148; B01D 67/0076; B01D 53/228; B01D 69/12; B01D 2256/24; B01D 2323/18; B01D 69/141; B01D 2257/102; B01D 2256/245; B01D 2325/32; B01D 69/088; Y02C 10/10

See application file for complete search history.

(56) References Cited

U.S. PATENT DOCUMENTS

| | | | | |
|---|---|---|---|---|
| 5,714,000 A * | 2/1998 | Wellen | ................... | C04B 12/04 106/122 |
| 5,853,653 A * | 12/1998 | Donato | ................. | C04B 35/571 264/625 |
| 6,881,361 B1 | 4/2005 | Schulze et al. | | |
| 7,071,258 B1 * | 7/2006 | Jang | ....................... | B82Y 30/00 423/445 B |
| 8,148,276 B2 * | 4/2012 | Nejhad | .................. | B82Y 30/00 442/172 |
| 9,211,504 B2 | 12/2015 | Bhuwania et al. | | |
| 2003/0015466 A1 | 1/2003 | Ji et al. | | |
| 2006/0170872 A1 * | 8/2006 | Zhang | .................... | G03B 21/20 353/31 |
| 2007/0017861 A1 | 1/2007 | Foley et al. | | |
| 2009/0053512 A1 * | 2/2009 | Pyun | ..................... | G11B 5/712 428/336 |
| 2011/0210073 A1 * | 9/2011 | Koros | .................... | B01J 20/262 210/674 |
| 2012/0135485 A1 * | 5/2012 | Koros | .................... | B01D 15/00 435/157 |
| 2013/0002545 A1 | 1/2013 | Li et al. | | |
| 2013/0025458 A1 | 1/2013 | Li et al. | | |
| 2016/0151746 A1 * | 6/2016 | Kratzer | .................. | B01D 71/64 95/45 |
| 2017/0274327 A1 * | 9/2017 | Koros | .................. | B01D 53/228 |

OTHER PUBLICATIONS

Clausi et al., "Formation of Defect-Free Polyimide Hollow Fiber Membranes for Gas Separation", Journal of Membrane Science, vol. 167, 2000, pp. 79-89.

Office Action, Eurasian Patent Application No. 201790692, dated Jan. 28, 2019, 5 pages.

Kosuri et al., "Defect-Free Asymmetric Hollow Fiber Membranes from Torlon®, A Polyamide-Imide Polymer, for High-Pressure Co2 Separations", Journal of Membrane Science, vol. 320, Issues 1-2, Jul. 15, 2008, pp. 65-72.

International Search Report and Written Opinion, PCT Patent Application No. PCT/US2018/040521, dated Sep. 17, 2018, 10 pages.

Singh et al., "Carbon Molecular Sieve Membrane Performance Tuning by Dual Temperature Secondary Oxygen Doping (Dtsod)", Journal of Membrane Science, vol. 427, Jan. 15, 2013, pp. 472-478.

Xu et al., "Matrimid® Derived Carbon Molecular Sieve Hollow Fiber Membranes for Ethylene/Ethane Separation", Journal of Membrane Science, vol. 380, Issues 1-2, Sep. 15, 2011, pp. 138-147.

Zhao et al., "Effects of Cross-Linkers with Different Molecular Weights in Cross-Linked Matrimid 5218 and Test Temperature on Gas Transport Properties", Journal of Membrane Science, vol. 323, Issue 1, Oct. 1, 2008, pp. 176-184.

European Patent Application No. 15844237.6, Extended European Search Report, dated Apr. 24, 2018, 13 pages.

Xu, Carbon Molecular Sieve Hollow Fiber Membranes for Olefin/Paraffin Separations, Georgia Institute of Technology, Dec. 2012.

Jiang et al., "Dual-Layer Hollow Carbon Fiber Membranes for Gas Separation Consisting of Carbon and Mixed Matrix Layers", Carbon, vol. 45, 2007, pp. 166-172.

Ma et al., "Ester-Cross-Linkable Composite Hollow Fiber Membranes for CO2 Removal from Natural Gas", Industrial & Engineering Chemistry Research, vol. 52, 2013.

Dai et al., Ultem((R))/ZIF-8 Mixed Matrix Hollow Fiber Membranes for CO2/N2 Separations, Journal of Membrane Science, vols. 401-402, 2012, pp. 76-82.

International Search Report and Written Opinion, PCT International Patent Application No. PCT/US15/45394, dated Nov. 13, 2015.

International Preliminary Report on Patentability, PCT International Patent Application No. PCT/US15/45394, dated Apr. 6, 2017.

\* cited by examiner

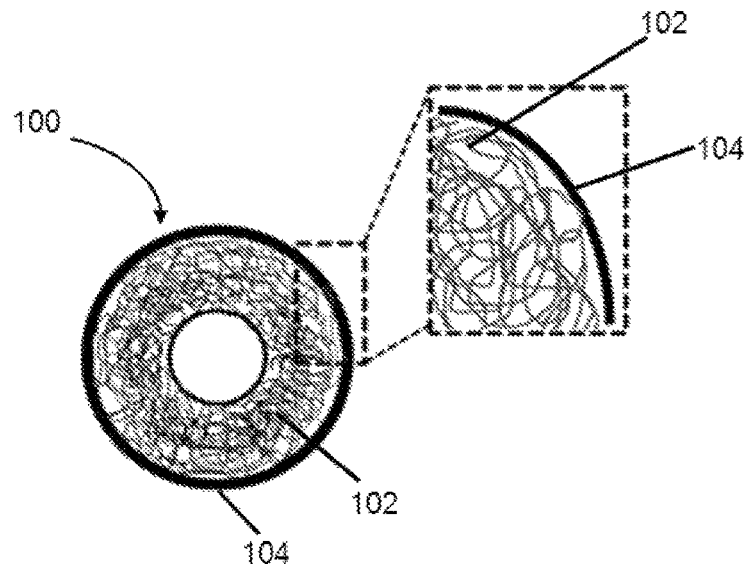
Figure 1
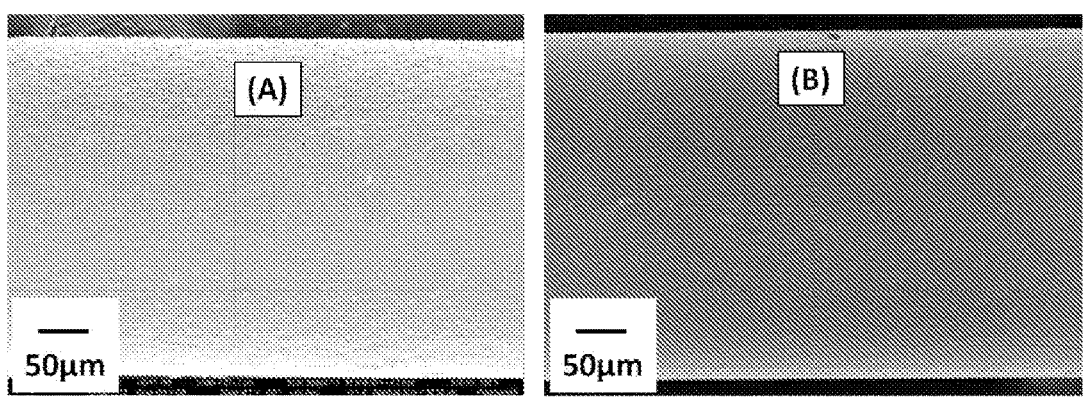
Figure 2: SEM images of outside surface of CMS fibers. (A) Using silicon dioxide without silane coated, and (B) using silicon dioxide with 2 wt% silane coated.

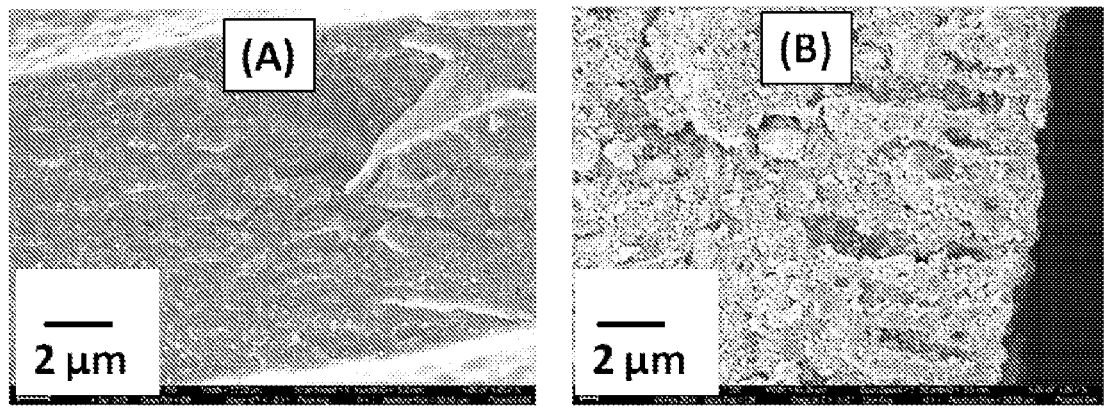
Figure 3: SEM images of cross section of CMS fibers. (A)Using high-bulk-density silicon dioxide, and (B) using low-bulk-density silicon dioxide with 2 wt% silane.
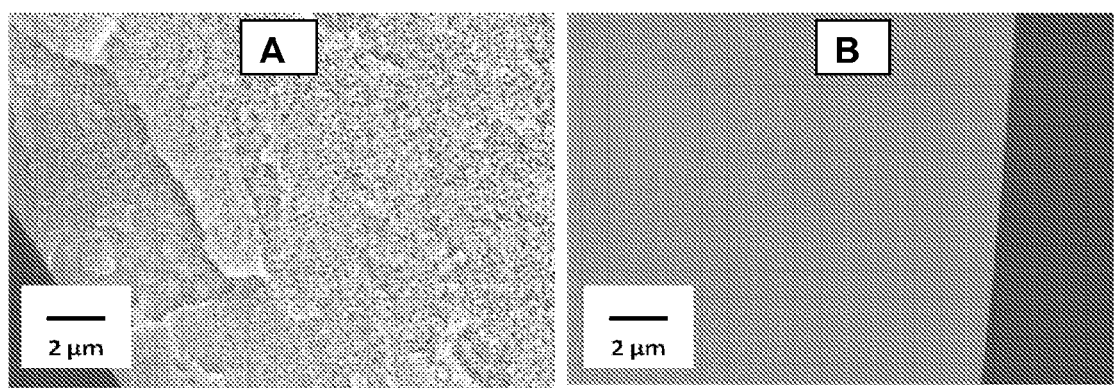
Figure 4: SEM image of cross section of (A) Matrimid® 5218 precursor fiber and (B) CMS fiber from Matrimid® 5218 precursor.

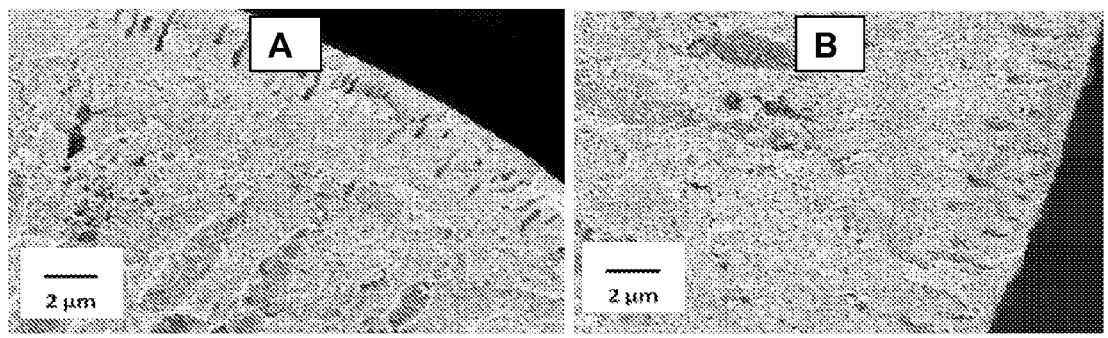
Figure 5. SEM image of cross section of (A) Matrimid® 5218 composite fiber with 25 wt% $SiO_2$* (US3448) loading and (B) CMS fiber from Matrimid® 5218 precursor fiber with 25 wt% $SiO_2$* (US3448) loading.
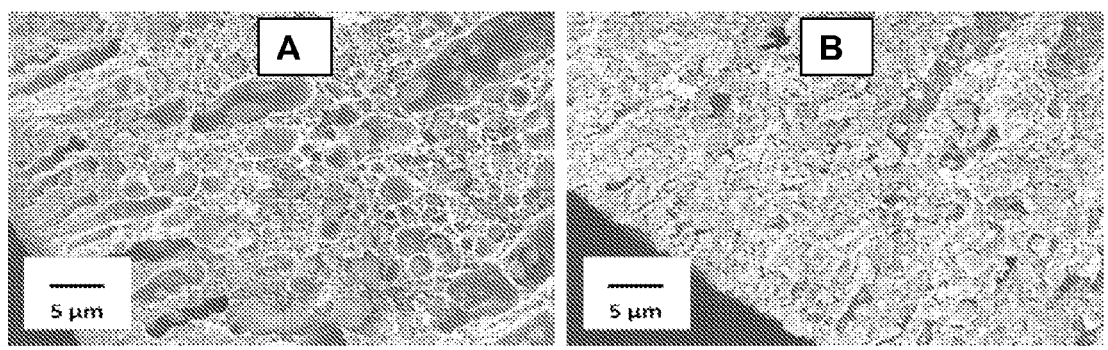
Figure 6. SEM image of cross section of (A) Matrimid® 5218 syringe extruded fiber with 25 wt% $SiO_2$ (C803) loading and (B) CMS fiber from Matrimid® 5218 precursor fiber with 25 wt% $SiO_2$ (C803) loading.

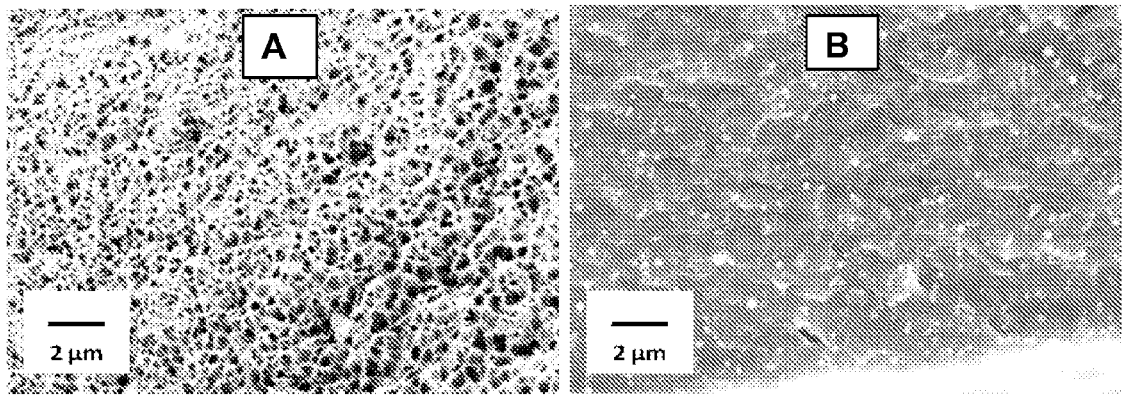
Figure 7. SEM image of cross section of (A) Matrimid® 5218 syringe extruded fiber with 25 wt% SiO$_2$ (S5505) loading and (B) CMS fiber from Matrimid® 5218 precursor fiber with 25 wt% SiO$_2$ (S5505) loading.
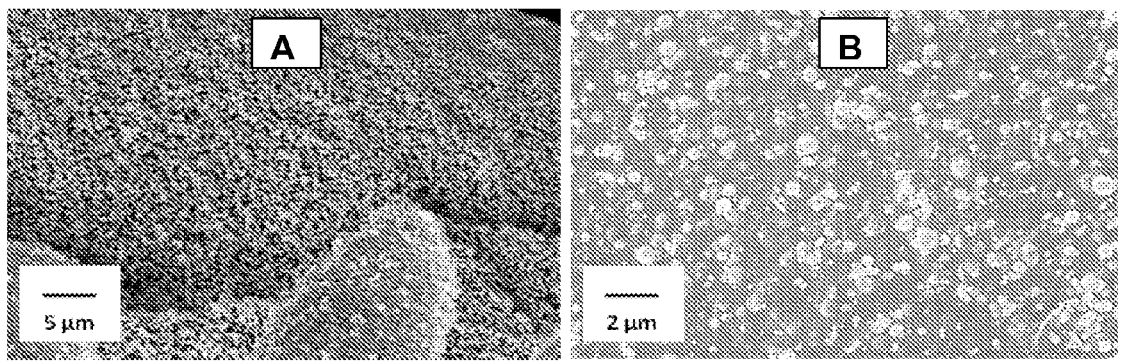
Figure 8. SEM image of cross section of (A) Matrimid® 5218 syringe extruded fiber with 25 wt% BaCO$_3$ loading and (B) CMS fiber from Matrimid® 5218 precursor fiber with 25 wt% BaCO$_3$ loading.

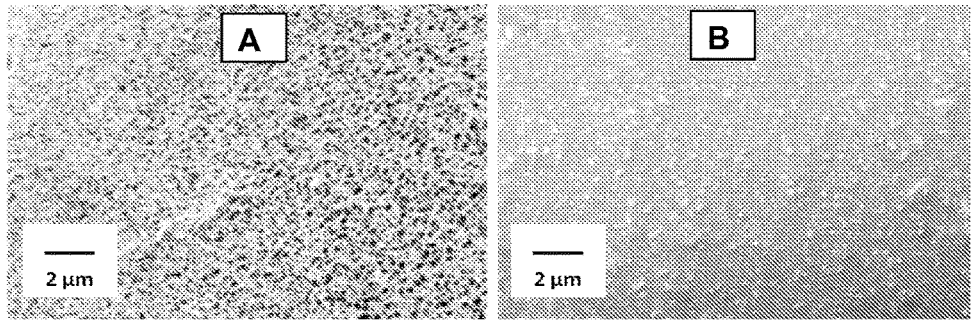
Figure 9. SEM image of cross section of (A) Matrimid® 5218 syringe extruded fiber with 25 wt% $Al_2O_3$ loading and (B) CMS fiber from Matrimid® 5218 precursor fiber with 25 wt% $Al_2O_3$ loading.
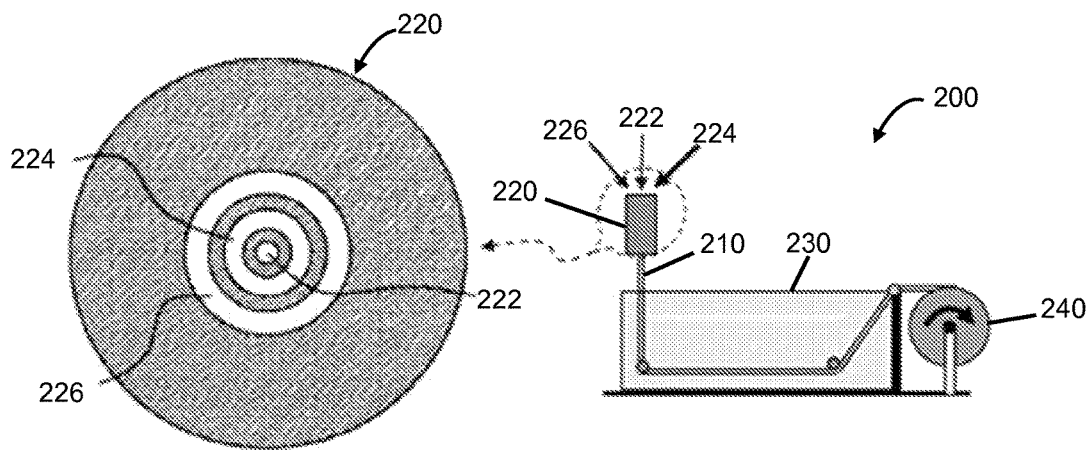
Figure 10. Triple orifice spinneret and spinning system for forming multilayer sheath-core precursors for asymmetric multilayer CMS formation after pyrolysis using the system shown in Figure 1.

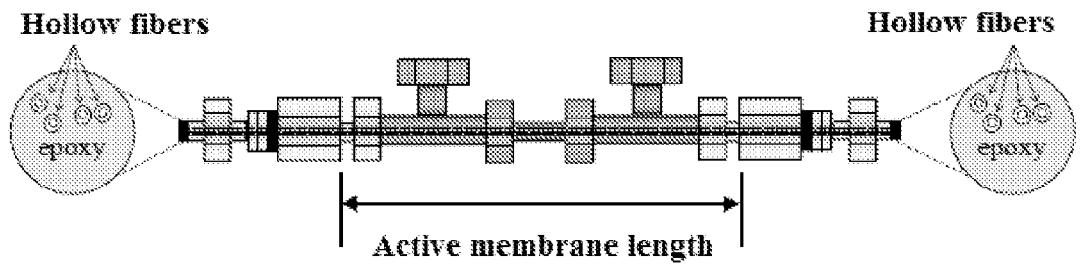
Figure 11: Schematic illustration of a lab-scale hollow fiber membrane module.
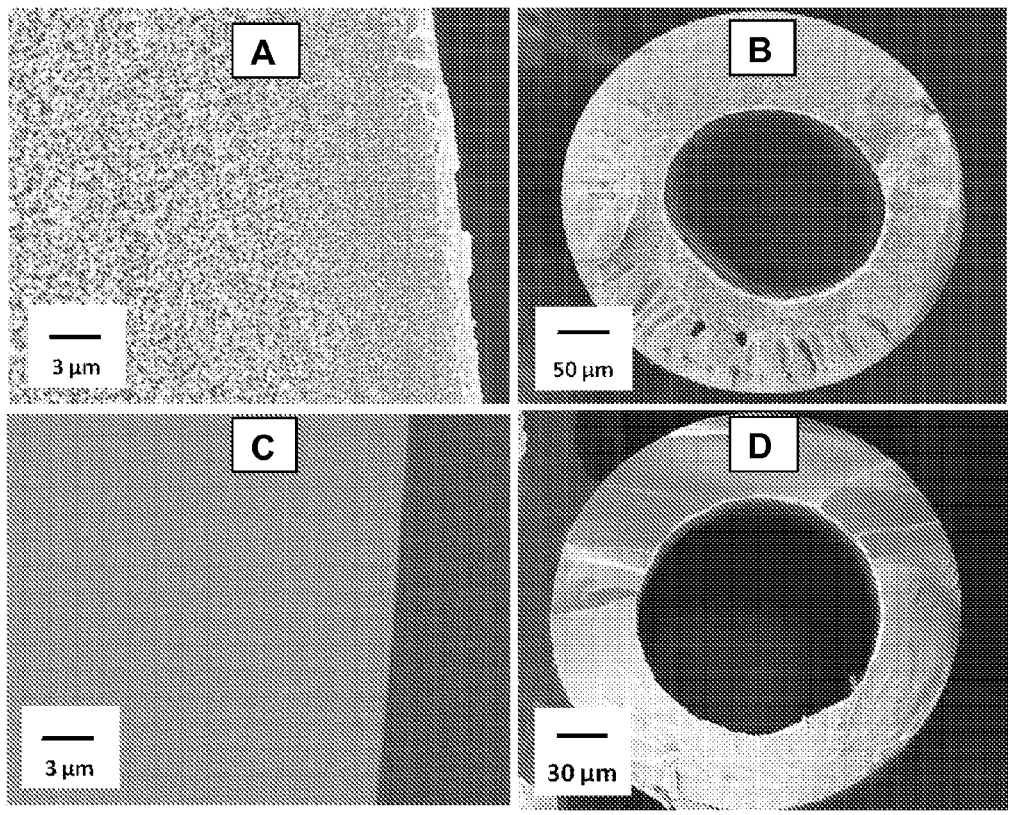
Figure 12. SEM images of (A) and (B): cross section of a single layer Matrimid® 5218 precursor fiber, (C) and (D): cross section of CMS fiber from Matrimid® 5218 precursor.

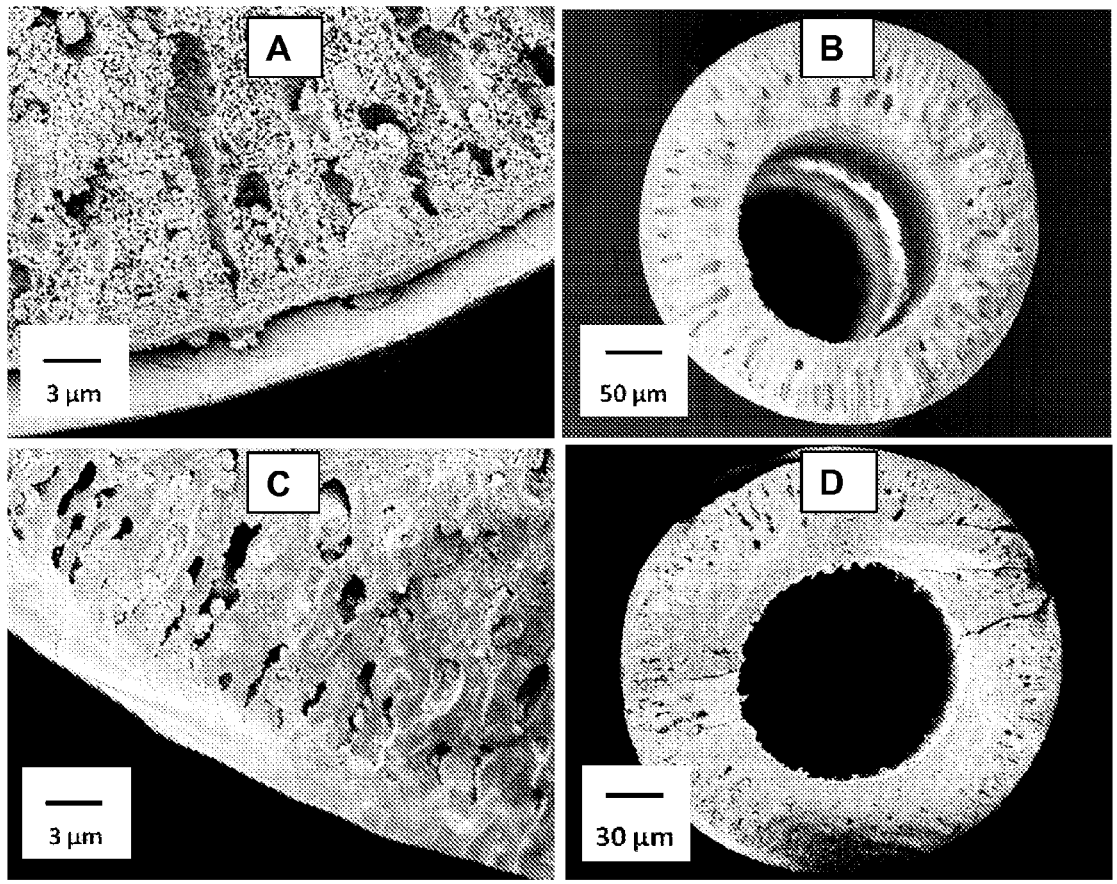
Figure 13. SEM images of (A) and (B): cross section of a dual layer 6FDA:BPDA-DAM(1:1) / (SiO$_2$* (US3448) + Matrimid® 5218) precursor fiber, (C) and (D): cross section of a dual layer CMS fiber from 6FDA:BPDA-DAM(1:1) / (SiO$_2$* (US3448) + Matrimid® 5218) precursor.

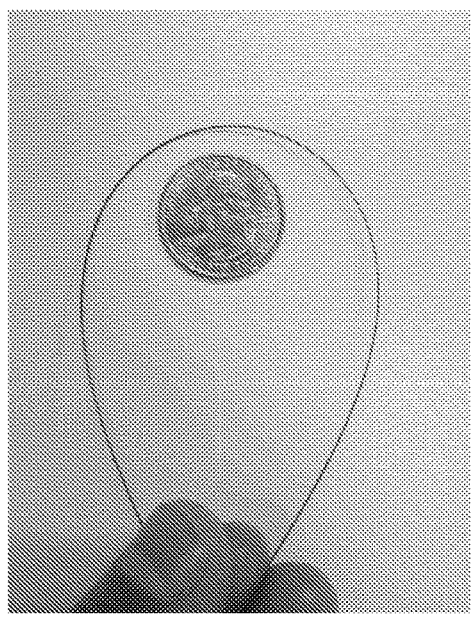
Figure 14. Good flexibility of a dual layer CMS fiber membrane from 6FDA:BPDA-DAM(1:1) / ($SiO_2$* (US3448) + Matrimid® 5218) precursor fiber with 25 wt% $SiO_2$* (US3448) loading.

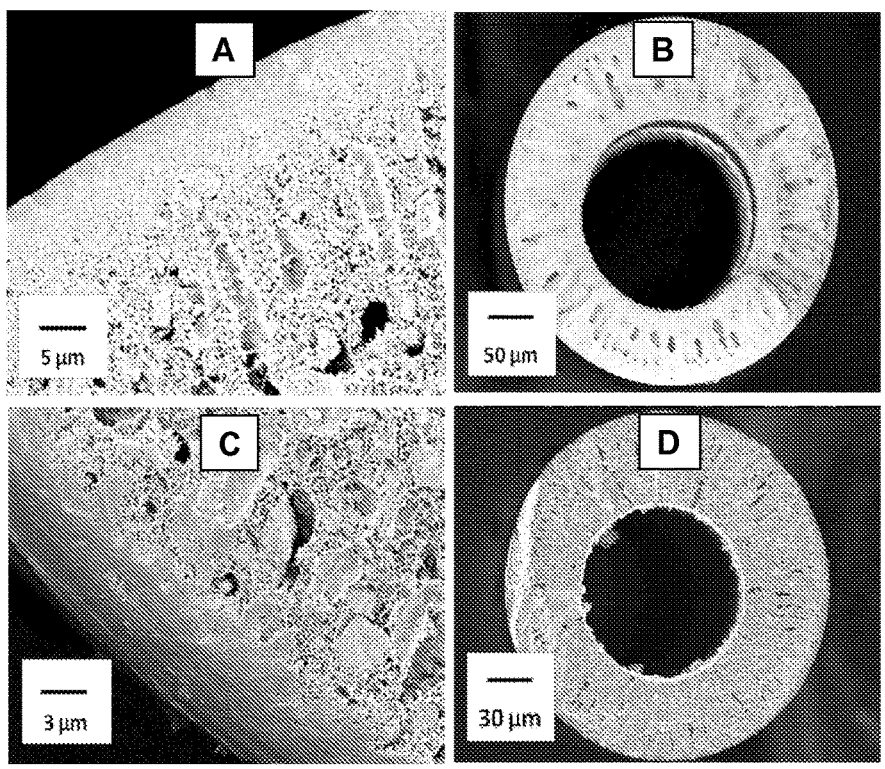
Figure 15. SEM images of (A) and (B): cross section of a dual layer Matrimid® 5218 / (SiO$_2$* (US3448) + Matrimid® 5218) precursor fiber, (C) and (D): cross section of a dual layer CMS fiber from Matrimid® 5218 / (SiO$_2$* (US3448) + Matrimid® 5218) precursor.

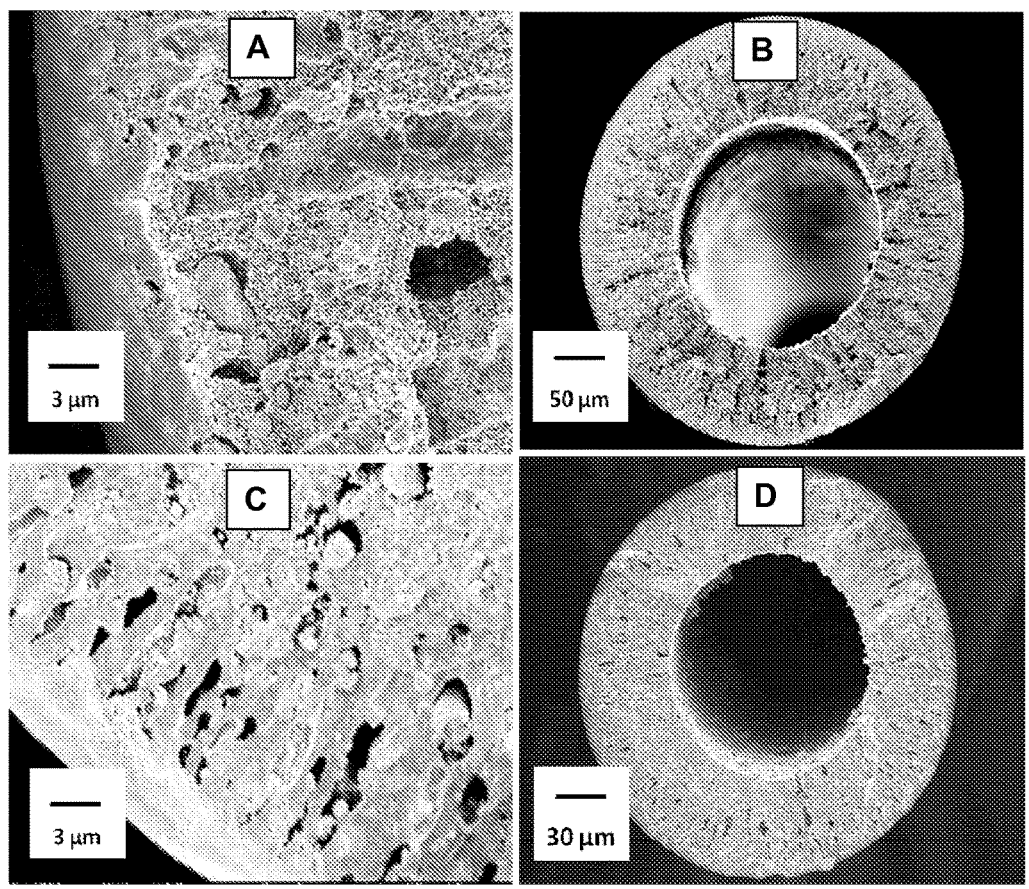
Figure 16. SEM images of (A) and (B): cross section of a dual layer Matrimid® 5218 / (SiO$_2$* (US3448) + 6FDA-DAM) precursor fiber, (C) and (D): cross section of a dual layer CMS fiber Matrimid® 5218 / (SiO$_2$* (US3448) + 6FDA-DAM) precursor.

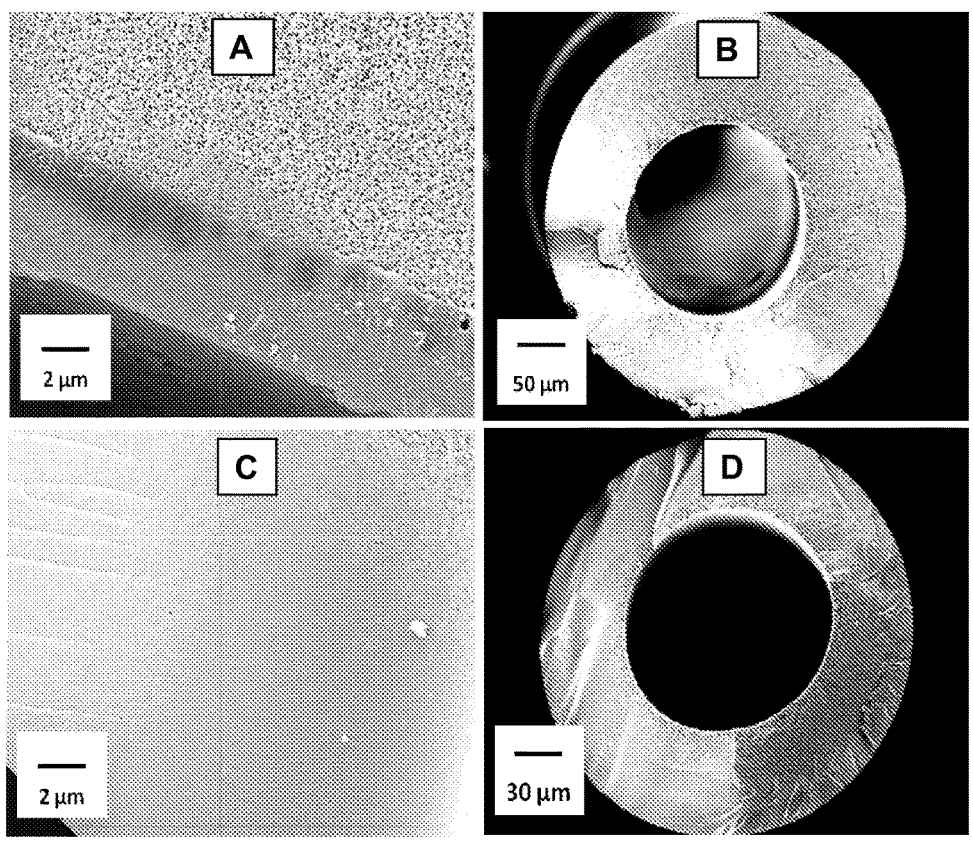
Figure 17. SEM images of (A) and (B): cross section of a dual layer Matrimid® 5218 / 6FDA:BPDA-DAM(1:1) precursor fiber, (C) and (D): cross section of a dual layer CMS fiber Matrimid® 5218 / 6FDA:BPDA-DAM(1:1) precursor.

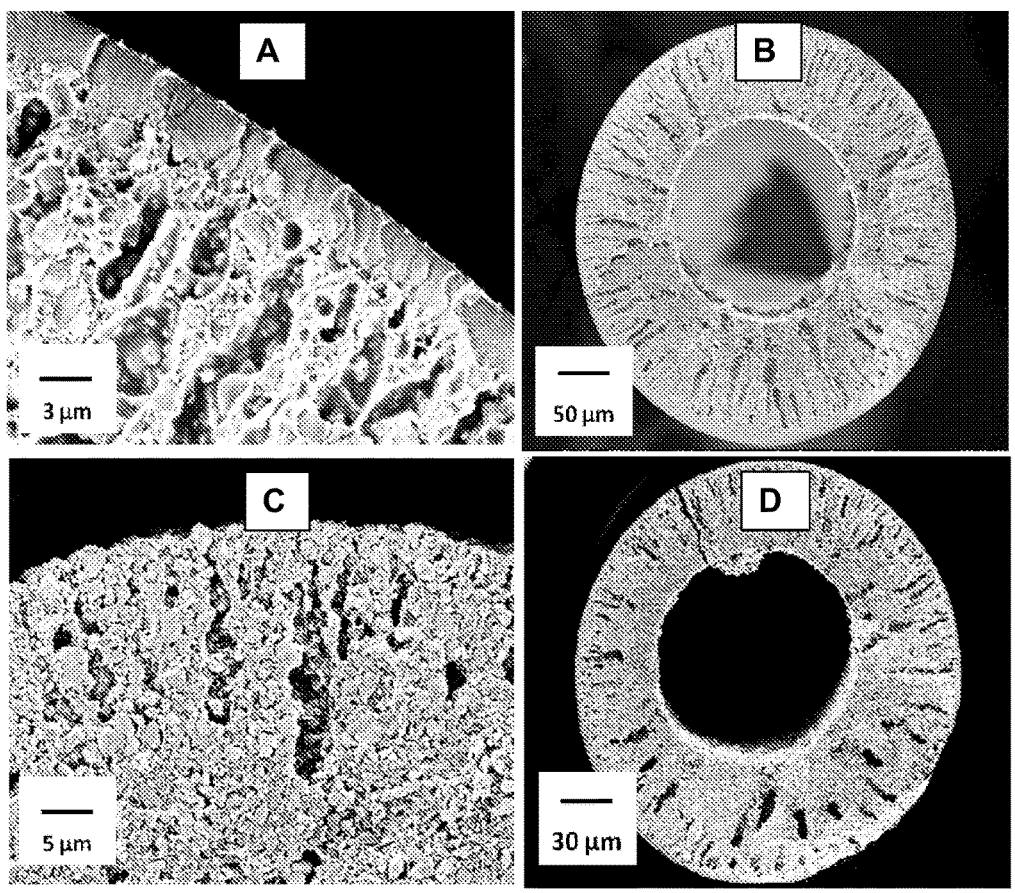
Figure 18. SEM images of (A) and (B): cross section of a dual layer Matrimid® 5218 / (SiO$_2$(C803) + Matrimid® 5218) precursor fiber, (C) and (D): cross section of a dual layer CMS fiber Matrimid® 5218 / (SiO$_2$(C803) + Matrimid® 5218) precursor.

COMPOSITE NANOPARTICLE STABILIZED CORE CARBON MOLECULAR SIEVE HOLLOW FIBER MEMBRANES HAVING IMPROVED PERMEANCE

CROSS REFERENCE TO RELATED APPLICATIONS

This is a U.S. national phase application under 35 U.S.C. § 371 of International Patent Application No. PCT/US2015/045394 titled "Composite Nanoparticle Stabilized Core Carbon Molecular Sieve Hollow Fiber Membranes Having Improved Permeance", which claims priority under 35 U.S.C. § 119(e) to U.S. Provisional Patent Application No. 62/053,464, filed Sep. 22, 2014; 62/066,625, filed Oct. 21, 2014; 62/067,699, filed Oct. 23, 2014, and 62/074,197, filed Nov. 3, 2014, the contents of which are hereby incorporated by reference.

FIELD OF THE INVENTION

The present invention relates generally to multilayer carbon molecular sieve ("CMS") membranes, and more specifically to asymmetric sheath-core CMS hollow fiber membranes.

BACKGROUND OF THE INVENTION

Processes using CMS membranes upgrade the value of gas streams by efficiently separating components from various feed sources. Examples of such applications include removing carbon dioxide ($CO_2$) and hydrogen sulfide ($H_2S$) from natural gas streams; separation of propylene ($C_3H_6$) from propane ($C_3H_8$) and ethylene ($C_2H_4$) from ethane ($C_2H_6$) in hydrocarbon mixtures; and separation of oxygen ($O_2$) from air. In these examples one or more valuable products can be separated from a less valuable feed stream in an energy efficient manner. Asymmetric multilayer CMS hollow fiber membranes are preferred for large scale high pressure applications due to their ability to be formed into compact modules with high surface-to-module volume properties.

It is known that dense flat polymer films can be used as precursors for forming CMS membranes, but the productivity of these membranes tends to be low. To increase the surface to volume packing, precursor asymmetric polymer fibers used to form CMS membranes can be formed in a so-called dry-jet/wet-quench spinning process that is well-known in the membrane art. These precursors are also known to be useful for forming CMS membranes. Important functional properties of CMS hollow fiber membranes include permeance and selectivity. Permeance measures the pressure-normalized flux of a given penetrant and provides a measure of membrane productivity. Selectivity measures the comparative ability of different gases to permeate through a membrane and provides a measure of separation efficiency. These properties, and the methods by which asymmetric multilayer CMS hollow fiber membranes may be tested to determine these properties, are described in more detail in, for example, U.S. Pat. Nos. 6,565,631 and 8,486,179. Pyrolysis of an appropriate precursor fibers at temperatures above the glass transition temperature ($T_g$) of the polymer creates a CMS fiber. Unfortunately, since the pyrolysis occurs above the polymer $T_g$, partial or even total collapse of the porous core layer typically occurs. This collapse creates a separation layer that is much thicker and that has a much lower permeance, and is therefore much less productive, than would be expected if the collapse could be avoided. Substructure morphology collapse occurs when high temperatures during pyrolysis relax the polymer chains in the porous core layer. The movement of the polymer segments allows collapse of the substructure, thereby undermining the productivity advantage provided by the asymmetric fiber.

U.S. Patent Application No. US201301522793A1, and International Patent Application No. WO2013095775A1 describe a method for post-treating precursor fibers in order to limit substructure collapse during pyrolysis. By soaking precursor fibers in a chemical modifying agent, such as vinyl trimethoxy silane (VTMS), before pyrolysis, asymmetric multilayer CMS hollow fibers having an increased permeance are formed. The chemical modifying agent stabilizes the precursor fiber prior to pyrolysis to prevent collapse of the substructure morpohology between the polymer $T_g$ and point of actual carbon formation. The above approach, although workable, requires an additional post-treatment step, thereby adding cost and complexity.

SUMMARY OF THE INVENTION

It has now surprisingly been found that the need for additional prepyrolysis soaking treatments with a modifying agent can be avoided by spinning a multilayer CMS precursor hollow fiber including an inner core support layer and an outer sheath layer, and incorporating properly selected nano-particle fillers into the core support layer.

Processes for preparing asymmetric multilayer CMS hollow fiber membranes are described herein. A process described herein includes co-extruding a core dope and a sheath dope through a spinneret to produce at least one multilayer CMS membrane precursor fiber. The core dope includes a first polymer (e.g. 6FDA:BPDA-DAM, Matrimid® 5218, 6FDA-DAM, 6FDA-DAM:DABA), a first solvent (e.g. N-methyl-2-pyrrolidone (NMP), tetrahydrofuran (THF)), and a plurality of nanoparticles (e.g., $SiO_2$, coated or chemically modified $SiO_2$, POSS silica, aminopropylisooctyl POSS, Octa Trimethylsiloxy POSS, nitride, carbide). The sheath dope includes a second polymer (e.g. 6FDA:BPDA-DAM, Matrimid® 5218, 6FDA-DAM, 6FDA-DAM:DABA) and a second solvent (e.g., NMP, THF). Optionally, the sheath dope does not include nanoparticles. Optionally, the sheath dope includes nanoparticles.

The process further includes pyrolyzing the CMS membrane precursor fiber to form an asymmetric multilayer CMS hollow fiber membrane. In any process described herein, optionally, the concentration and type of the plurality of nanoparticles may be selected to obtain an asymmetric multilayer CMS hollow fiber membrane having a desired combination of gas permeance and selectivity.

In any process described herein, the extruded multilayer CMS membrane precursor fiber includes a core layer having a substantially annular cross section and a sheath layer having a substantially annular cross section, wherein the sheath layer is adjacent to and radially outward from the core layer. Optionally, the core layer of the extruded multilayer CMS membrane precursor fiber includes substantially all of the nanoparticles from the core dope. Optionally, the sheath layer of the extruded multilayer CMS membrane precursor fiber is substantially free of nanoparticles.

The pyrolyzed asymmetric multilayer CMS hollow fiber membrane includes a core layer having a substantially annular cross section and a sheath layer having a substantially annular cross section, wherein the sheath layer is adjacent to and radially outward from the core layer. The core layer of the pyrolyzed asymmetric multilayer CMS hollow fiber membrane includes substantially all of the plurality of nanoparticles from the core layer of the extruded multilayer CMS membrane precursor fiber. Optionally, the sheath layer of the pyrolyzed asymmetric multilayer CMS hollow fiber membrane is substantially free of nanoparticles.

Optionally the first polymer (i.e., the polymer in the core dope) and the second polymer (i.e., the polymer in the sheath dope) are the same polymer, but alternatively, they may be different polymers. When the first and second polymers are different polymers, optionally the second polymer may have a $T_g$ that is equal to or greater than the $T_g$ of the first polymer, but alternatively the second polymer may have a $T_g$ that is equal to or less than the the $T_g$ of the first polymer.

Optionally the nanoparticles may be hydrophobic. Optionally, the nanoparticles may be polyhedral oligomeric silsesquioxane ("POSS") silica nanoparticles. Optionally, the nanoparticles in the core layer are more thermally stable than silica nanoparticles, but which can be dispersed to form a stable core dope and which promote optimum performance of the final sheath-core CMS fiber membrane in conditions for which silica nanoparticle may be insufficiently stable.

The core layer of the extruded multilayer CMS membrane precursor fiber optionally may include 25-40 wt % nanoparticles based on polymer weight in the core layer. Alternatively, the core layer of the extruded multilayer CMS membrane precursor fiber optionally may include 10-25 wt % nanoparticles based on polymer weight in the core layer.

Also described herein are asymmetric multilayer CMS hollow fiber membranes including a core layer and a sheath layer. The core layer includes a pyrolyzed first polymer and a plurality of nanoparticles, and the sheath layer includes a pyrolyzed second polymer. The core layer has a substantially annular cross-section, and the sheath layer also has a substantially annular cross-section but is adjacent to and radially outward from the core layer. Optionally, the asymmetric multilayer CMS hollow fiber membrane has a gas permeance at least 300% (e.g. at least 600% or at least 800%) greater than a gas permeance of an otherwise equivalent asymmetric multilayer CMS hollow fiber membrane that does not include nanoparticles in the core layer. Optionally, an asymmetric multilayer CMS hollow fiber membrane described herein has a selectivity that is at least 85% of the selectivity of an otherwise equivalent asymmetric multilayer CMS hollow fiber membrane that that does not include nanoparticles in a core layer.

Optionally, an asymmetric multilayer CMS hollow fiber membrane described herein has a $CO_2$ permeance of at least 50 GPU and a $CO_2/CH_4$ selectivity of at least 60 when subjected to a mixed feed containing 50 mol % $CO_2$ and 50 mol % $CH_4$ at 150 psi and 35° C. Optionally, an asymmetric multilayer CMS hollow fiber membrane described herein has an $O_2$ permeance of at least 80 GPU and a $O_2/N_2$ selectivity of at least 9 when subjected to a single gas feed at 50 psi and 70° C. Optionally, an asymmetric multilayer CMS hollow fiber membrane described herein has a $C_2H_4$ permeance of at least 5 GPU and a $C_2H_4/C_2H_6$ selectivity of at least 4 when subjected to a single gas feed at 100 psi and 35° C. Optionally, an asymmetric multilayer CMS hollow fiber membrane described herein has a $C_3H_8$ permeance of at least 5 GPU and a $C_3H_6/C_3H_8$ selectivity of at least 20 when subjected to a mixed feed containing 50 mol % $C_3H_6$ and 50 mol % $C_3H_8$ at 100 psi and 35° C.

Also described herein are asymmetric multilayer CMS hollow fiber membranes produced by any of the processes described herein.

Finally, disclosed herein are processes of separating mixtures of at least two gases using the asymmetric multilayer CMS hollow fiber membranes described herein. A process for separating a mixture of at least two gases includes contacting the mixture of at least two gases with any of the multilayer CMS hollow fiber membranes described herein to separate the mixture into a permeate stream that is enriched in a first gas and a retentate stream that is enriched in a second gas. Optionally, the mixture of at least two gases comprises $CO_2$ and $CH_4$; $H_2S$ and $CH_4$; $CO_2$, $H_2S$, and $CH_4$; $CO_2$ and $N_2$; $O_2$ and $N_2$; $N_2$ and $CH_4$; He and $CH_4$; $H_2$ and $CH_4$; $H_2$ and $C_2H_4$; —$C_2H_4$ and $C_2H_6$; $C_3H_6$ and $C_3H_8$; or $C_2H_6/C_3H_8$ and $C_2H_4/C_3H_6$. Optionally, the mixture of at least two gases comprises acid gases and natural gases. Optionally, the mixture of at least two gases comprises $CO_2$ and at least one hydrocarbon, and wherein the permeate stream is enriched in $CO_2$.

Any process described herein optionally may further include, prior to pyrolyzing the CMS hollow fiber membrane precursor, contacting the CMS hollow fiber membrane precursor with one or more solvent exchange materials including a modifying agent (e.g., a silane, a vinyltrimethoxysilane, a vinyltriethoxysilane). The modifying agent is present in an amount effective to improve the gas permeance of the asymmetric multilayer CMS hollow fiber membrane.

Also disclosed herein are processes for preparing multilayer hollow fiber membranes. These processes may optionally include coextruding a core dope and a sheath dope through a spinneret to produce at least one multilayer hollow fiber membrane precursor. The core dope comprises a first polymer (e.g. 6FDA:BPDA-DAM, Matrimid® 5218, 6FDA-DAM, 6FDA-DAM:DABA, polybenzoxazole, polybenzothiazole, polybenzimidazole), a first solvent (e.g. NMP, THF), and a plurality of nanoparticles, the sheath dope comprises a second polymer (e.g. polybenzoxazole, polybenzothiazole, polybenzimidazole) and a second solvent (e.g. NMP, THF), and the second polymer is a thermally rearrangable polymer. The process further includes heating the multilayer hollow fiber membrane precursor to form an asymmetric composite thermally rearranged hollow fiber membrane having a desired combination of gas permeance and selectivity properties. The heating step is carried out at temperatures between 270° C. and 450° C. for a period of 1-4 hours.

BRIEF DESCRIPTION OF THE DRAWINGS

A clear conception of the advantages and features of one or more embodiments will become more readily apparent by reference to the exemplary, and therefore non-limiting, embodiments illustrated in the drawings:

FIG. 1 is a schematic illustration of a dual-layer composite precursor fiber.

FIG. 2 shows SEM images of outside surface of CMS fibers: (A) using silicon dioxide without silane coated, and (B) using silicon dioxide with 2 wt % silane coated.

FIG. 3 shows SEM images of cross section of CMS fibers: (A) using high-bulk-density silicon dioxide, and (B) using low-bulk-density silicon dioxide with 2 wt % silane.

FIG. 4 shows SEM images of cross section of (A) Matrimid® 5218 syringe extruded precursor fiber and (B) CMS fiber from Matrimid® 5218 precursor.

FIG. 5 shows SEM images of cross section of (A) Matrimid® 5218 syringe extruded fiber with 25 wt % $SiO_2$* (US3448) loading and (B) CMS fiber from Matrimid® 5218 precursor fiber with 25 wt % $SiO_2$* (US3448) loading.

FIG. 6 shows SEM images of cross section of (A) Matrimid® 5218 syringe extruded fiber with 25 wt % $SiO_2$ (C803) loading and (B) CMS fiber from Matrimid® 5218 precursor fiber with 25 wt % $SiO_2$ (C803) loading.

FIG. 7 shows SEM images of cross section of (A) Matrimid® 5218 syringe extruded fiber with 25 wt % $SiO_2$ (S5505) loading and (B) CMS fiber from Matrimid® 5218 precursor fiber with 25 wt % $SiO_2$ (S5505) loading.

FIG. 8 shows SEM images of cross section of (A) Matrimid® 5218 syringe extruded fiber with 25 wt % $BaCO_3$ loading and (B) CMS fiber from Matrimid® 5218 precursor fiber with 25 wt % $BaCO_3$ loading.

FIG. 9 shows SEM images of cross section of (A) Matrimid® 5218 syringe extruded fiber with 25 wt % $Al_2O_3$ loading and (B) CMS fiber from Matrimid® 5218 precursor fiber with 25 wt % $Al_2O_3$ loading.

FIG. 10 is an illustration of triple orifice spinneret and spinning system for forming multilayer sheath-core precursors for asymmetric multilayer CMS formation after pyrolysis using the system shown in FIG. 1.

FIG. 11 is a schematic illustration of a lab-scale hollow fiber membrane module.

FIG. 12 shows SEM images of (A) and (B): cross section of a single layer Matrimid® 5218 precursor fiber, (C) and (D): cross section of CMS fiber from Matrimid® 5218 precursor.

FIG. 13 shows SEM images of (A) and (B): cross section of a dual layer 6FDA:BPDA-DAM(1:1)/($SiO_2$* (US3448)+Matrimid® 5218) precursor fiber, (C) and (D): cross section of a dual layer CMS fiber from 6FDA:BPDA-DAM(1:1)/($SiO_2$* (US3448)+Matrimid® 5218) precursor.

FIG. 14 is an illustration of Good flexibility of a dual layer CMS fiber membrane from 6FDA:BPDA-DAM(1:1)/($SiO_2$* (US3448)+Matrimid® 5218) precursor fiber with 25 wt % $SiO_2$* (US3448) loading.

FIG. 15 shows SEM images of (A) and (B): cross section of a dual layer Matrimid® 5218/($SiO_2$* (US3448)+Matrimid® 5218) precursor fiber, (C) and (D): cross section of a dual layer CMS fiber from Matrimid® 5218/($SiO_2$* (US3448)+Matrimid® 5218) precursor.

FIG. 16 shows SEM images of (A) and (B): cross section of a dual layer Matrimid® 5218/($SiO_2$* (US3448)+6FDA-DAM) precursor fiber, (C) and (D): cross section of a dual layer CMS fiber Matrimid® 5218/($SiO_2$* (US3448)+6FDA-DAM) precursor.

FIG. 17 shows SEM images of (A) and (B): cross section of a dual layer Matrimid® 5218/6FDA:BPDA-DAM(1:1) precursor fiber, (C) and (D): cross section of a dual layer CMS fiber Matrimid® 5218/6FDA:BPDA-DAM(1:1) precursor.

FIG. 18 shows SEM images of (A) and (B): cross section of a dual layer Matrimid® 5218/($SiO_2$(C803)+Matrimid® 5218) precursor fiber, (C) and (D): cross section of a dual layer CMS fiber Matrimid® 5218/($SiO_2$(C803)+Matrimid® 5218) precursor.

DETAILED DESCRIPTION OF THE INVENTION

Described herein are processes for preparing asymmetric multilayer CMS hollow fiber membranes, processes for preparing asymmetric multilayer hollow fiber membranes including thermally rearranged polymers, asymmetric multilayer CMS hollow fiber membranes, and processes for separating mixtures of gases using asymmetric multilayer CMS hollow fiber membranes.

The processes for preparing asymmetric multilayer CMS hollow fiber membranes described herein include co-extruding a core dope and a sheath dope through a spinneret to produce at least one multilayer CMS membrane precursor fiber. The core dope includes a first polymer, a first solvent, and a plurality of nanoparticles. The sheath dope includes a second polymer and a second solvent. Optionally, the sheath dope does not include nanoparticles. Optionally, the core dope and/or the sheath dope may include more than one polymer. Optionally, the sheath dope may include additional components such as a nonsolvent and/or a pore former.

The asymmetric multilayer CMS precursor fibers have a multilayer, composite structure including a sheath polymer material supported on a porous core polymer material. FIG. 1 is a cross-sectional view of a schematic of a CMS precursor fiber 100 as described herein showing a substantially annular core 102 surrounded by a substantially annular sheath 104. The multilayer, composite structures may be formed by using more than one polymer dope material during the asymmetric hollow fiber spinning process and using nanoparticle fillers in the core dope so that the nanoparticles are incorporated into the core layer of the sheath-core composite.

By including nanoparticle fillers in the core dope, but not in the sheath dope, an asymmetric multilayer CMS precursor hollow fiber may be formed that includes a core layer that includes nanoparticles from the core dope and a sheath layer that is substantially free of nanoparticles. Substantially free of nanoparticles means that the sheath is either free of nanoparticles or includes only those nanoparticles that inadvertently cross into the sheath layer from the core layer during the spinning or quenching process.

The nanoparticles in the core layers of the asymmetric multilayer CMS membrane precursor fibers described herein limit collapse of pores of the core layers of the hollow fibers during pyrolysis of the fibers to CMS membranes. Limiting pore collapse brings about an increase in the gas permeance of the asymmetric multilayer CMS hollow fiber membrane over membranes that are prepared in the same manner but without a nanoparticle stabilized core. Careful selection of the size of the nanoparticle stabilizing fillers prevents damaging the selective sheath layer of the CMS hollow fiber membrane as described herein.

The nanoparticle stabilizing fillers are non-uniformly attached to the polymer matrix of the porous core layer. Such non-uniform attachment leads to incomplete interfacial bonding between the nanoparticle and surrounding matrix, which surprisingly avoids the collapse of pores during pyrolysis while maintaining adequate flexibility for handling. Particle size and hydrophobicity are controllable features of the nanoparticles that can be used to tune the dispersibility and degree of non-uniform attachment within the core layer to obtain the desired core layer non-collapse, with adequate flexibility in the final CMS fiber.

The term nanoparticle stabilizing fillers as used herein refers to particles with some dimension below 500 nm that act to restrict pore collapse during pyrolysis by residing in the porous core substructure of the asymmetric multilayer CMS hollow fiber. The partially attached nanoparticle stabilizing fillers in the core layer of a sheath-core composite fiber act as a sort of scaffolding within a pore, thereby preventing the collapse of the pore. In some embodiments, the nanoparticle stabilizing fillers may be porous. Where the nanoparticle stabilizing filler is porous, the flow of gas through the CMS hollow fiber membrane core may be promoted, and the weight of the fiber can be reduced.

In some embodiments, the core polymer may contain functional reactive groups that react with the nanoparticle stabilizing fillers. Reaction of the nanoparticle stabilizing fillers and the polymer precursor fiber is not necessary for the utility of the nanoparticle stabilizing fillers in the CMS hollow fiber membrane. However, it is contemplated that some precursor polymer materials may react with the nanoparticle stabilizing fillers. For example, precursors prepared using polymer materials that contain hydroxyl (—OH) groups or acid (such as —COOH) functional groups may react with the nanoparticle stabilizing fillers; however, control of the reaction is required to avoid gelation of the core spinning dope, so reaction after formation of the asymmetric precursor membrane is preferred, if it occurs.

The nanoparticle stabilizing fillers may contain non-carbon elements, such as silicon or other elements, thereby decreasing the weight percent of carbon in the nanoparticle stabilized core CMS hollow fiber membrane. A nanoparticle stabilized CMS hollow fiber membrane is, therefore, not defined by the amount or percentage of carbon in its elemental makeup and does not require a particular minimum amount or percentage of carbon to be present.

Optionally the nanoparticles used in the asymmetric multilayer CMS hollow fiber membranes and the process described herein are coated silicon dioxide nanoparticles. Optionally, the nanoparticles are hydrophobic. One example of suitable nanoparticles are silane-coated silicon dioxide nanoparticles having a bulk density of 0.056 g/cm$^3$ with 15 nm average particle size (commercially available from U.S. Research Nanomaterials, Inc. as product # US3448). Those silane-coated silicon dioxide nanoparticles are coated with 2 wt % silane, are strongly hydrophobic, and are easily dispersed in organic solvent.

Low bulk density coated silicon dioxide occupies a large portion of the volume in composite fibers and maintains the porous structure during pyrolysis, without comprising a large mass fraction of the fiber. Use of silicon dioxide with higher bulk density (around 0.326 g/cm$^3$) at the same 25 wt % $SiO_2$ loading as used with the preferred case is not able to maintain the porous structure during pyrolysis as shown in Comparative Example 3.

It will be understood by a person of ordinary skill in the art that other nanoparticles can be used as stabilizers. Other high-temperature-resistant materials suitable as nanoparticles include other coated or chemically modified silicon dioxide, POSS silica nanoparticles, aminopropylisooctyl POSS, Octa Trimethylsiloxy POSS, metal oxides, metal carbides, and metal nitrides.

If nanoparticles of the above materials can be well dispersed in organic solvents, have low bulk density, and do not degrade during pyrolysis to the point where they damage the structure, they may also be good fillers to restrict substructure collapse during pyrolysis of composite fibers. Lack of these important properties, however, leads to unsuccessful results. For example, commercial silicon dioxide nanoparticles without silane coating or other modification are not preferred in the materials and methods described herein.

Commercial silicon dioxide nanoparticles without silane coating or other modification were used to make a mixed matrix hollow fiber. The bulk density and particle size of this silicon dioxide was similar to the silicon dioxide with 2 wt % silane coated. The dried silicon dioxide without silane coating was dispersed in a NMP and THF mixture. Even though sonication bath was used to assist the dispersion of nanoparticles, visible agglomerates could be found. We spun Matrimid/($SiO_2$+Matrimid) dual-layer fibers, using silicon dioxide without silane coated, and pyrolyzed fibers in the presence of UHP Argon to form CMS membranes. FIG. 2 shows SEM images of the outside surface of CMS fibers, (A) using silicon dioxide without silane coated, and (B) using silicon dioxide with 2 wt % silane coated. The agglomerates of silicon dioxide without silane coated in core layer penetrate the thin sheath layer. This defective sheath layer caused non-selectivity of gas separation. In contrast, silicon dioxide with 2 wt % silane was well dispersed in the organic solvents and no agglomerates formed. The resultant CMS fiber demonstrates smooth outside surface.

FIG. 3 shows SEM images of cross section of CMS fibers, (A) using high-bulk-density silicon dioxide, and (B) using low-bulk-density silicon dioxide with 2 wt % silane. The commercial silicon dioxide with 2 wt % silane has extreme low bulk density (around 0.056 g/cm$^3$). As a result, silicon dioxide occupies a large portion of the volume in the composite fibers and maintains the porous structure during pyrolysis as shown in FIG. 3 B). We used another silicon dioxide with higher bulk density (around 0.326 g/cm$^3$) to spin $SiO_2$+Matrimid fiber with 25 wt % $SiO_2$ loading. This silicon dioxide occupies only a small portion of the volume in the composite fibers and is not able to maintain the porous structure during pyrolysis, as shown in FIG. 3(A).

Selection of materials can be performed as is discussed in the examples and comparative examples where workable and unworkable fillers are identified in terms of their abilities to prevent collapse of porosity in syringe extruded fibers.

The core layer of the extruded multilayer CMS membrane precursor fiber optionally may include 25-40 wt % nanoparticles based on polymer weight in the core layer. Alternatively, the core layer of the extruded multilayer CMS membrane precursor fiber optionally may include 10-25 wt % nanoparticles based on polymer weight in the core layer.

The processes described herein include pyrolyzing the CMS membrane precursor fiber to form an asymmetric multilayer CMS hollow fiber membrane. The pyrolysis temperature may be between about 500° C. and about 1000° C. (e.g., 500° C. and 800° C., 500° C. and 700° C., 500° C. and 650° C., 500° C. and 600° C., 500° C. and 550° C., 550° C. and 1000° C., 550° C. and 800° C., 550° C. and 700° C., 500° C. and 650° C., 600° C. and 1000° C., 600° C. and 800° C., 600° C. and 700° C., 600° C. and 650° C.). The pyrolysis temperature is typically reached by a process in which the temperature is slowly ramped up. For example, when using a pyrolysis temperature of 650° C., the pyrolysis temperature may be achieved by increasing the temperature from 50° C. to 250° C. at a ramp rate of 13.3° C./min, increasing the temperature from 250° C. to 635° C. at a ramp rate of 3.85° C./min, and increasing the temperature from 635° C. to 650° C. at a ramp rate of 0.25° C./min. Once the pyrolysis temperature is reached, the fibers are heated at the pyrolysis temperature for a soak time, which may be a number of hours.

The pyrolyzed asymmetric multilayer CMS hollow fiber membrane includes a core layer having a substantially annular cross section and a sheath layer having a substantially annular cross section, wherein the sheath layer is adjacent to and radially outward from the core layer. The core layer of the pyrolyzed asymmetric multilayer CMS hollow fiber membrane includes substantially all of the plurality of nanoparticles from the core layer of the extruded multilayer CMS membrane precursor fiber. Optionally, the sheath layer of the pyrolyzed asymmetric multilayer CMS hollow fiber membrane is substantially free of nanoparticles.

Polymers

Optionally the first polymer (i.e., the polymer in the core dope) and the second polymer (i.e., the polymer in the sheath dope) are the same polymer, but alternatively, they may be different polymers. When the first and second polymers are different polymers, optionally the second polymer may have a $T_g$ that is equal to or greater than the $T_g$ of the first polymer, but alternatively the second polymer may have a $T_g$ that is equal to or less than the the $T_g$ of the first polymer.

The sheath and core polymer, in principle, may include any polymeric material that, after undergoing pyrolysis, produces a CMS membrane that permits passage of the desired gases to be separated in which at least one of the desired gases permeates through the CMS fiber at a different permeation rate than another component from which it is to be separated. For example, a feed of carbon dioxide ($CO_2$) and methane ($CH_4$) in natural gas can be decontaminated by selectively permeating $CO_2$ while retaining most of the $CH_4$ in the nonpermeate (retentate) stream. The polyimide family are preferred CMS precursor materials, and polyimides suitable for sheath and core polymers include, for example, Matrimid® 5218, 6FDA/BPDA-DAM, 6FDA-6FpDA, 6FDA-IPDA and Ultem® 1000.

The polyimide commercially sold as Matrimid® 5218 is a thermoplastic polyimide based on a specialty diamine, 5(6)-amino-1-(4' aminophenyl)-1,3,-trimethylindane. Its structure is:

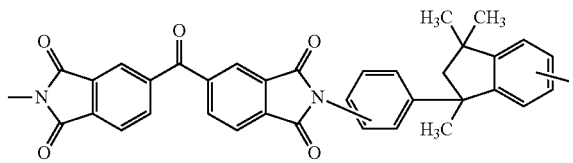

The Matrimid® 5218 polymers used in Examples herein were obtained from Huntsman International LLC. 6FDA/BPDA-DAM is a polymer made up of 2,4,6-Trimethyl-1,3-phenylene diamine (DAM), 3,3,4,4-biphenyl tetracarboxylic dianhydride (BPDA), and 5,5-[2,2,2-trifluoro-1-(trifluoromethyl)ethylidene]bis-1,3-isobenzofurandione (6FDA), which is also a desirable polymer for use in the processes and membranes described herein, forming a broad family of useful polymers. Different ratios of the 6FDA/BPDA dianhydrides can be used. Moreover different diamines or mixtures of diamines can be used to tailor the properties of the polyimides.

lulosic polymers, such as cellulose acetate-butyrate, cellulose propionate, ethyl cellulose, methyl cellulose, nitrocellulose, etc.; poly-amides and polyimides, including aryl polyamides and aryl polyimides; polyethers; polyetherimides; polyetherketones; poly(arylene oxides) such as poly(phenylene oxide) and poly(xylene oxide); poly(esteramide-diisocyanate); polyurethanes; polyesters (including polyarylates), such as poly(ethylene terephthalate), poly (alkyl methacrylates), poly(acrylates), poly(phenylene terephthalate), etc.; polypyrrolones; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

Preferably, the polymer is a rigid, glassy polymer at room temperature as opposed to a rubbery polymer or a flexible glassy polymer. Glassy polymers are differentiated from rubbery polymers by the rate of segmental movement of polymer chains. Polymers in the glassy state do not have the rapid molecular motions that give rubbery polymers their liquid-like nature and their ability to adjust segmental configurations rapidly over large distances (>5 nm). Glassy polymers exist in a non-equilibrium state with entangled molecular chains with immobile molecular backbones in frozen conformations. The glass transition temperature (Tg) is the dividing point between the rubbery or glassy state. Above the Tg, the polymer exists in the rubbery state, and below the Tg, the polymer exists in the glassy state. Generally, glassy polymers provide a more size-selective environment for gas diffusion and are favored for gas separation

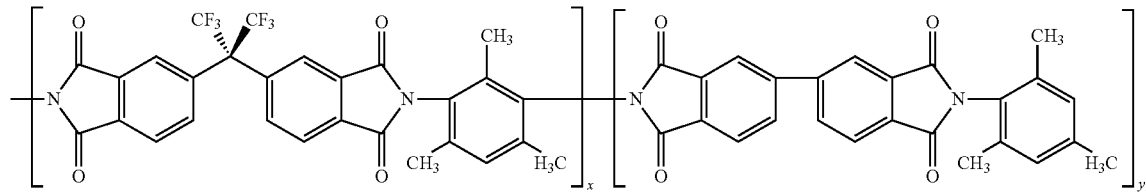

To obtain the above-mentioned polymers one can use available sources or synthesize them. For example, such a polymer is described in U.S. Pat. No. 5,234,471.

Examples of other suitable CMS precursor polymers include polysulfones; poly(styrenes), including styrene-containing copolymers such as acrylonitrilestyrene copolymers, styrene-butadiene copolymers and styrene-vinylbenzylhalide copolymers: polycarbonates; polyfurfuryl alcohol; celapplications. Rigid, glassy polymers describe polymers with rigid polymer chain backbones that have limited intramolecular rotational mobility and are often characterized by having high glass transition temperatures.

Asymmetric Multilayer CMS Hollow Fiber Membranes

Asymmetric multilayer CMS hollow fiber membranes described herein include a core layer and a sheath layer. The core layer includes a pyrolyzed first polymer and a plurality of nanoparticles and the sheath layer includes a pyrolyzed second polymer. The core layer has a substantially annular cross-section, and the sheath layer also has a substantially annular cross-section but is adjacent to and radially outward from the core layer. Optionally, the asymmetric multilayer CMS hollow fiber membrane has a gas permeance at least 300% (e.g. at least 600% or at least 800%) greater than a gas permeance of an otherwise equivalent asymmetric multilayer CMS hollow fiber membrane that does not include nanoparticles in the core layer. Optionally, any asymmetric multilayer CMS hollow fiber membrane described herein has a selectivity that is at least 85% of the selectivity of an otherwise equivalent asymmetric multilayer CMS hollow fiber membrane that that does not include nanoparticles in a core layer.

Optionally, any asymmetric multilayer CMS hollow fiber membrane described herein has a $CO_2$ permeance of at least 50 GPU and a $CO_2/CH_4$ selectivity of at least 60 when subjected to a mixed feed containing 50 mol % $CO_2$ and 50 mol % $CH_4$ at 150 psi and 35° C. Optionally, any asymmetric multilayer CMS hollow fiber membrane described herein has an $O_2$ permeance of at least 80 GPU and a $O_2/N_2$ selectivity of at least 9 when subjected to a single gas feed at 50 psi and 70° C. Optionally, any asymmetric multilayer CMS hollow fiber membrane described herein has a $C_2H_4$ permeance of at least 5 GPU and a $C_2H_4/C_2H_6$ selectivity of at least 4 when subjected to a single gas feed at 100 psi and 35° C. Optionally, any asymmetric multilayer CMS hollow fiber membrane described herein has a $C_3H_8$ permeance of at least 5 GPU and a $C_3H_6/C_3H_8$ selectivity of at least 20 when subjected to a mixed feed containing 50 mol % $C_3H_6$ and 50 mol % $C_3H_8$ at 100 psi and 35° C.

Also described herein are asymmetric multilayer CMS hollow fiber membranes produced by any of the processes described herein.

The materials and methods described herein may be used without limitation in combination with other known materials and methods for gas purification. For example, known polymeric materials that may be useful as sheath layers in the asymmetric multilayer CMS precursor hollow fibers include cross-linkable polymers, polymers of intrinsic microporosity (PIMs), and mixed matrix materials.

Pre-Treatment of CMS Precursor Fiber Prior to Pyrolysis

Any process described herein, optionally may further include prior to pyrolyzing the CMS hollow fiber membrane precursor, contacting the CMS hollow fiber membrane precursor with one or more solvent exchange materials including a modifying agent (e.g., a silane, a vinyltrimethoxysilane, a vinyltriethoxysilane). The modifying agent is present in an amount effective to improve the gas permeance of the asymmetric multilayer CMS hollow fiber membrane.

Treatment of Thermally Re-Arranged Polymer Membranes

The pores and channels within a polymer film or fiber typically have a wide range of sizes, which render the polymer structures generally unsuitable for gas separation applications. In various embodiments, pyrolysis of a polymer material forms a carbon molecular sieve material having ordered pores. However, certain polymers may be treated to render the polymer itself suitable for gas separation applications. Thermally re-arranged polymer membranes, also known as TR polymer membranes or TR polymer fibers, remedy the problem of variable molecularly selective pore sizes by thermally driving spatial rearrangement of rigid polymer chain segments in the glassy phase in order to produce pores having a more controlled size. These changes in the polymer structure are said to increase permeability and selectivity properties, rendering the polymer suitable for gas separation.

Preferred thermally re-arranged polymer membranes comprise aromatic polymers that are interconnected with heterocyclic rings. Examples include polybenzoxazoles, polybenzothiazoles, and polybenzimidazoles. Preferred thermally re-arranged polymer precursors comprise polyimides with ortho-positioned functional groups, such as for example HAB-6FDA, a polyimide having the following structure.

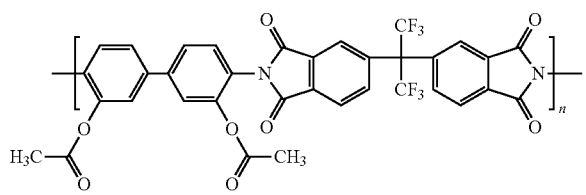

The phenylene-heterocyclic ring units in such materials have rigid chain elements and a high-torsional energy barrier to rotation between the two rings, which prevents indiscriminant rotation. Thermal re-arrangement of these polymers can thus be controlled to create pores having a narrow size distribution, rendering them useful for gas separation applications.

The temperature at which the thermal rearrangement occurs is generally lower than the temperatures used for pyrolysis, as pyrolysis would convert the polymer fiber into a carbon fiber. Polyimides, for example, are typically heated to a temperature between about 250° C. and about 500° C., more preferably between about 300° C. and about 450°. The heating of the polymers generally takes place in an inert atmosphere for a period of several hours. Although the polymer is not subjected to the same stresses of pyrolysis, heating of the polymer at a temperature sufficient to cause thermal re-arrangement also results in undesirable pore collapse.

Accordingly, disclosed herein are processes of preparing hollow fiber membranes with TR polymers as the sheath or core layers. Formation of sheath and core layers is performed in the same manner described above with respect to treatment of polymer precursor fibers that are then pyrolyzed to form asymmetric multilayer CMS hollow fiber membranes. The difference being, of course, that polymer material is subjected to thermal re-arrangement as opposed to pyrolysis.

Processes for preparing multilayer CMS hollow fiber membrane therefore may optionally include coextruding a core dope and a sheath dope through a spinneret to produce at least one multilayer hollow fiber membrane precursor. The core dope comprises a first polymer (e.g. 6FDA:BPDA-DAM, Matrimid® 5218, 6FDA-DAM, 6FDA-DAM:DABA, polybenzoxazole, polybenzothiazole, polybenzimidazole), a first solvent, and a plurality of nanoparticles, the sheath dope comprises a second polymer (e.g. polybenzoxazole, polybenzothiazole, polybenzimidazole) and a second solvent, and the second polymer is a thermally rearrangable polymer. The process further includes heating the multilayer hollow fiber membrane precursor to form an asymmetric composite thermally rearranged hollow fiber membrane having a desired combination of gas permeance and selectivity properties. The heating step is carried out at temperatures between 270° C. and 450° C. for a period of 1-4 hours.

Cross-Linkable Sheath Materials:

For polymer membranes to be used in natural gas purification, the membranes must be resistant to plasticization caused by exposure to high partial pressures of $CO_2$ and/or the presence of highly sorbing contaminants in the feed. Plasticization causes the polymer to swell and increases chain segmental motion, eventually causing the polymer to lose its size and shape discriminating ability. This becomes apparent as a concomitant increase in permeability of both $CO_2$ and $CH_4$, with a loss in $CO_2/CH_4$ selectivity. Covalent cross-linking using a class of cross-linkable polyimides has been shown to increase plasticization resistance by suppressing the degree of swelling and segmental chain mobility in the polymer, thereby preserving the selectivity of the membrane. This class of crosslinkable polyimides utilizes a diaminobenzoic acid (DABA) moiety in the polyimide backbone as a site for interchain crosslinking. The use of 1,3-prodanediol, leads to "PDMC" (propanediol monoester cross-linkable) polyimide. After a membrane is made from the material, cross-linking may be carried out by heating the membrane in the solid state at temperatures above –150° C. under vacuum or an inert sweep gas to activate a transesterification reaction. This material may be formed into an asymmetric membrane as described by Omole et al., in *Macromolecules,* 2008, 41, 6367-6375, After cross-linking occurs, the material becomes insoluble and more resistant to swelling by feed components that undermine intrinsic selectivity. Crosslinkable polymers can be used as the sheath layer of a sheath-core composite fiber, as has been reported in the dissertation by Ma, "Highly Productive Ester Cross-linkable Composite Hollow Fiber Membranes for Aggressive Natural Gas Separations", Georgia Institute of Technology, October 2012. Accordingly, the current disclosure encompasses use of such crosslinkable polymers as the sheath layer in asymmetric multilayer CMS precursor hollow fibers. The cross-linkable polymer sheath layer on a nanoparticle-stabilized polymer core layer can be used for separation or can be pyrolyzed to form a CMS composite membrane according the current disclosure.

Polymers of Intrinsic Microporosity (PIM) Sheath Materials:

Polymers of Intrinsic Microporosity (PIMs) refer to organic polymers that lack sufficient conformational flexibility to pack efficiently, thereby producing a highly rigid and contorted macromolecular structure that is unable to pack efficiently. PIMS are, therefore, macroporous materials with interconnected porosity. Despite their rigid structures, PIMs are soluble in some organic solvents, such as Tiff, thereby allowing them to be processed as sheath layers as embodiments of the present invention. The PIMs sheath layer on a nanoparticle-stabilized polymer core layer can be used for separation or can be pyrolyzed to form a CMS composite membrane according the current disclosure.

Mixed Matrix Materials (MMM) Sheath Materials:

Mixed matrix materials (MMMs) have the potential to surpass the intrinsic separation performance of pure polymeric materials. The incorporation of molecular sieving zeolite, metal organic framework (MOF) or carbon (CMS) filler particles into a polymer phase can improve the separation performance of the MMM to overcome the so-called upper bound of pure polymers. Mixed matrix membrane with MOF fillers in the sheath layer of a sheath-core composite fiber have been reported for propylene-propane separation. Accordingly, the present disclosure is directed to use of MMMs as the sheath layer in asymmetric multilayer CMS precursor hollow fibers. The MMM sheath layer on a nanoparticle-stabilized polymer core layer can be used for separation or can be pyrolyzed to form a CMS composite membrane according the current invention.

Finally, disclosed herein are processes of separating mixtures of at least two gases using the asymmetric multilayer CMS hollow fiber membranes described herein. A process for separating a mixture of at least two gases includes contacting the mixture of at least two gases with any of the multilayer CMS hollow fiber membranes described herein to separate the mixture into a permeate stream that is enriched in a first gas and a retentate stream that is enriched in a second gas. Optionally, the mixture of at least two gases comprises $CO_2$ and $CH_4$; $H_2S$ and $CH_4$; $CO_2$, $H_2S$, and $CH_4$; $CO_2$ and $N_2$; $O_2$ and $N_2$; $N_2$ and $CH_4$; He and $CH_4$; $H_2$ and $CH_4$; $H_2$ and $C_2H_4$; $C_2H_4$ and $C_2H_6$; $C_3H_6$ and $C_3H_8$; or $C_2H_6/C_3H_8$ and $C_2H_4/C_3H_6$. Optionally, the mixture of at least two gases comprises acid gases (e.g. EXAMPLES) and natural gases (e.g. EXAMPLES). Optionally, the mixture of at least two gases comprises $CO_2$ and at least one hydrocarbon, and wherein the permeate stream is enriched in $CO_2$.

Formulating a workable composition to create a composite sheath-core structure requires careful selection of the two layers and subsequent processing as described herein. Forming a composite structure with the sheath containing essentially no nanoparticles and the core containing appropriately selected nanoparticles creates a surprisingly effective precursor that can be pyrolyzed to provide high permeance without having an adverse effect on the selectivity of the resultant CMS sheath layer of the membrane. Eliminating the additional soaking steps required in prior approaches provides manufacturing savings and simplification. In addition, using a lower cost nanoparticle-containing core layer to support a higher cost, high-performance sheath layer without nanoparticles also produces a surprising lower cost, higher performance membrane as compared to a similar composite without nanoparticles in the core. The current invention, therefore provides the ability to prevent collapse of the porous support layer, and also enables the use of different sheath and core polymers which is not revealed in prior non-collapse approaches.

EXAMPLES

In examples described herein, the nanoparticles were first dried in a vacuum oven at 180° C. overnight, to remove any moisture in the pores. The dried nanoparticles were dispersed in an appropriate solvent or solvent mixture described herein. A sonication bath was used to assist the dispersion of nanoparticles, and sonication was stopped when no visible agglomerates could be found. A solution containing about 10 wt % of the total core polymer was first added slowly to the nanoparticle dispersion in an attempt to avoid clumping of the nanoparticles. The remaining solvent and dried polymer solids were then added to make dopes with the desired composition. The dopes were rolled on a standard lab roll mixer to be homogenous before being put into pumps for spinning Low-bulk-density of the preferred fillers helps provide a fiber that maintains its porous core structure during pyrolysis.

Comparative Example 1

Matrimid® 5218 was used to make non-hollow fibers by syringe extrusion through a simple 10 cc hypodermic syringe (BD Luer-Lok™ Tip) without a hypodermic needle. This technique is known in the field as a convenient way to study precipitation of diverse dope compositions, as is described by Wallace et al., in *J. Membr. Sci.,* 2006, 278, 92-104. Prior to syringe extrusion, the Matrimid® 5218 was dissolved in the organic solvent N-methylpyrrolidone (NMP). The dope composition is shown in Table 1.

TABLE 1

Dope composition of Matrimid® 5218 for syringe extrusion.
Dope Composition

| Component | Mass (g) |
| --- | --- |
| Matrimid® 5218 | 10 |
| NMP | 25 |

After the syringe extrusion, the fibers were soaked in water baths for 3 days to remove the last traces of organic solvent, as is typically done with hollow fibers formed by spinneret extrusion. The fibers were then solvent exchanged in glass containers with three separate 20 min methanol baths followed by three separate 20 min hexane baths and dried under vacuum at 75° C. for 3 hrs, as is typically done with hollow fibers formed by spinneret extrusion.

The syringe extruded fibers were placed on a stainless steel wire mesh and held in place by wrapping a length of wire around the mesh and fibers. The mesh support containing the fibers was then loaded into standard pyrolysis equipment. As with standard spinneret extruded hollow fibers, pyrolysis was carried out under an atmosphere of ultra high purity argon (99.9% pure) as follows:
1. Soak for 15 min at 50° C.
2. 50° C. to 250° C. at a ramp rate of 13.3° C./min
3. 250° C. to 535° C. at a ramp rate of 3.85° C./min
4. 535° C. to 550° C. at a ramp rate of 0.25° C./min
5. Soak for 2 hours at 550° C.

Scanning electron microscopy (SEM) was used to characterize the morphology of precursor and CMS hollow fiber membranes. A LEO 1550 SEM equipped with a thermally assisted field emission gun was used, and the operation voltage was 10 kV. The fibers were soaked in hexane and then shear fractured in liquid nitrogen using tweezers to preserve the morphology of fiber cross-sections. All fibers were coated with gold before SEM examinations. The substructure of the pyrolyzed fibers created by the syringe extrusion collapsed completely after pyrolysis, as shown in FIG. 4. FIG. 4A shows a scanning electron microscope (SEM) image of a cross section of Matrimid® 5218 precursor fiber and FIG. 4B shows a SEM image of a cross section of a CMS fiber from Matrimid® 5218 precursor.

Example 1

Commercial silane-coated (SiO$_2$*) silicon dioxide nanoparticles (Product # US3448, US Research Nanomaterials, Inc.) were utilized to make syringe extruded fibers. The bulk density of the silane-coated silicon dioxide nanoparticles is 0.056 g/cm$^3$ with 15 nm average particle size. The silicon dioxide nanoparticles are modified with 2 wt % silane, and they are strongly hydrophobic and easily dispersed in the organic solvent. The silane-coated silicon dioxide nanoparticles were first dried in a vacuum oven at 180° C. overnight, in order to remove any moisture in the pores. The dried silane-coated silicon dioxide nanoparticles were dispersed in NMP (N-methylpyrrolidone). A sonication bath was used to assist the dispersion of nanoparticles, and sonication was stopped when no visible agglomerates were apparent. A NMP solution containing about 10 wt % of the total Matrimid® 5218 polymer was first added slowly to the silicon dioxide dispersion. The remaining solvent and dried polymer solids were then added to make dopes of the desired composition, as shown in Table 2. The dopes were rolled on a standard rolling mixer until they became uniform.

TABLE 2

Dope composition of Matrimid® 5218 with 25 wt %
SiO$_2$* (US3448) loading for syringe extrusion.
Dope Composition

| Component | Mass (g) |
| --- | --- |
| Matrimid® 5218 | 10 |
| NMP | 25 |
| SiO$_2$* (US3448) | 3.4 |

After syringe extrusion, the fibers were soaked in water baths for 3 days to remove the last traces of solvent. The fibers were then solvent exchanged in glass containers with three separate 20 min methanol baths followed by three separate 20 min hexane baths and dried under vacuum at 75° C. for 3 hrs.

The syringe extruded fibers were placed on a stainless steel wire mesh and held in place by wrapping a length of wire around the mesh and fibers. The mesh support containing the fibers was then loaded to a pyrolysis setup. Pyrolysis was carried out under an atmosphere of ultra high purity argon (99.9% pure) as follows:
1. Soak for 15 min at 50° C.
2. 50° C. to 250° C. at a ramp rate of 13.3° C./min
3. 250° C. to 535° C. at a ramp rate of 3.85° C./min
4. 535° C. to 550° C. at a ramp rate of 0.25° C./min
5. Soak for 2 hours at 550° C.

The resulting CMS fibers were analyzed by scanning electron microscope (SEM). SEM analysis showed restricted substructure collapse, as indicated in FIG. 5. FIG. 5 shows a SEM image of a cross section of (A) Matrimid® 5218 syringe extruded fiber with 25 wt % SiO$_2$* (US3448) loading and (B) CMS fiber from Matrimid® 5218 precursor fiber with 25 wt % SiO$_2$* (US3448) loading. Surprisingly, the substructure of CMS composite fiber remained very porous, unlike the dense CMS from the neat polymer precursor fiber in FIG. 4 without SiO$_2$* nanoparticles.

Comparative Example 2

Commercial silicon dioxide nanoparticles (Product # C803, W.R. Grace) were utilized to make syringe extruded fibers. The bulk density of the C803 silicon dioxide is 0.07 g/cm$^3$ with 3.8 µm average particle size. The dope composition is shown in Table 3. The dope preparation, syringe extrusion, solvent exchange and fiber pyrolysis were prepared as in Example 1.

TABLE 3

Dope composition of Matrimid® 5218 with
25 wt % SiO$_2$ (C803) loading for syringe extrusion.
Dope Composition

| Component | Mass (g) |
| --- | --- |
| Matrimid® 5218 | 10 |
| NMP | 25 |
| SiO$_2$(C803) | 3.4 |

The resulting CMS fibers were analyzed by scanning electron microscope (SEM). SEM analysis showed restricted substructure collapse. The substructure of CMS composite fiber remained very porous, as shown in FIG. 6.

FIG. 6 shows SEM images of a cross section of (A) Matrimid® 5218 syringe extruded fiber with 25 wt % SiO$_2$ (C803) loading and (B) CMS fiber from Matrimid® 5218 precursor fiber with 25 wt % SiO$_2$ (C803) loading. Unfortunately, the large particles of SiO$_2$ (C803) can damage the sheath layer when spinning the dual-layer hollow fibers (as shown late in Comparative Example 8).

Comparative Example 3

Commercial silicon dioxide nanoparticles (Product # S5505, Sigma) were utilized to make syringe extruded fibers. The bulk density of this silicon dioxide is 0.326 g/cm$^3$ with 60 nm average particle size. The dope composition is shown in Table 4. The dope preparation, syringe extrusion, solvent exchange and fiber pyrolysis were prepared as in Example 1.

TABLE 4

Dope composition of Matrimid ® 5218 with 25 wt % SiO$_2$ (S5505) loading for syringe extrusion.
Dope Composition

| Component | Mass (g) |
| --- | --- |
| Matrimid ® 5218 | 10 |
| NMP | 25 |
| SiO$_2$(S5505) | 3.4 |

The resulting CMS fibers were analyzed by scanning electron microscope (SEM) which showed substructure collapse and lack of adequate porosity, as shown in FIG. 7. FIG. 7 shows SEM images of cross sections of (A) Matrimid® 5218 syringe extruded fiber with 25 wt % SiO$_2$ (S5505) loading and (B) CMS fiber from Matrimid® 5218 precursor fiber with 25 wt % SiO$_2$ (S5505) loading.

Comparative Example 4

Commercial barium carbonate nanoparticles (BaCO$_3$, Sigma) were utilized to make syringe extruded fibers. The average particle size of BaCO$_3$ is 800 nm. The dope composition is shown in Table 5. The dope preparation, syringe extrusion, solvent exchange and fiber pyrolysis were prepared as in Example 1.

TABLE 5

Dope composition of Matrimid ® 5218 with 25 wt % BaCO$_3$ loading for syringe extrusion.
Dope Composition

| Component | Mass (g) |
| --- | --- |
| Matrimid ® 5218 | 10 |
| NMP | 25 |
| BaCO$_3$ | 3.4 |

The resulting CMS fibers were analyzed by scanning electron microscope (SEM). SEM analysis showed substructure collapse and lack of adequate porosity, as shown in FIG. 8. FIG. 8 shows SEM images of cross sections of (A) Matrimid® 5218 syringe extruded fiber with 25 wt % BaCO$_3$ loading and (B) CMS fiber from Matrimid® 5218 precursor fiber with 25 wt % BaCO$_3$ loading.

Comparative Example 5

Commercial aluminum oxide nanoparticles (Al$_2$O$_3$, Sigma) were utilized to make syringe extruded fibers. The average particle size of Al$_2$O$_3$ is 300 nm. The dope composition is shown in Table 6. The dope preparation, syringe extrusion, solvent exchange and fiber pyrolysis were prepared as in Example 1.

TABLE 6

Dope composition of Matrimid ® 5218 with 25 wt % Al$_2$O$_3$ loading for syringe extrusion.
Dope Composition

| Component | Mass (g) |
| --- | --- |
| Matrimid ® 5218 | 10 |
| NMP | 25 |
| Al$_2$O$_3$ | 3.4 |

The resulting CMS fibers were analyzed by scanning electron microscope (SEM). SEM analysis showed substructure collapse and lack of adequate porosity, as shown in FIG. 9. FIG. 9 shows SEM images of cross sections of (A) Matrimid® 5218 syringe extruded fiber with 25 wt % Al$_2$O$_3$ loading and (B) CMS fiber from Matrimid® 5218 precursor fiber with 25 wt % Al$_2$O$_3$ loading.

From the preceding examples and comparative examples and the remainder of the disclosure, one of skill in the art would understand how to identify workable and nonworkable particles for use in the membranes and processes described herein.

Precursor Hollow Fibers

Comparative Example 6

Matrimid® 5218 was used to spin hollow fiber membranes using a modification of a conventional dry-jet/wet-quench spinning process shown in FIG. 10. The modified system included a triple orifice spinneret. FIG. 10 shows a schematic of a spinning system 200 for spinning a fiber 210, including a triple orifice spinneret 220 including a center orifice 222 for a bore fluid, an inner annular orifice 224 for a core dope, and an outer annular orifice 226 for a sheath dope. FIG. 10 also shows a quench bath 230 and a fiber collection spool 240. The dope composition is shown in Table 7.

TABLE 7

Dope composition for spinning Matrimid ® 5218 fiber membranes.
Dope Composition

| Component | Core dope Mass (g) | Sheath dope Mass (g) |
| --- | --- | --- |
| Polymer | 100 6FDA:BPDA-DAM(1:1) | 26.2 Matrimid ® 5218 |
| NMP | 300 | 53 |
| THF | 0 | 5.9 |
| LiNO$_3$ | 0 | 0 |
| EtOH | 0 | 14.9 |

Matrimid® 5218 precursor fibers were placed on a stainless steel wire mesh and held in place by wrapping a length of wire around the mesh and fibers. The mesh support containing the fibers was then loaded to a pyrolysis setup. Pyrolysis was carried out under an atmosphere of ultra-high purity argon (99.9% pure) as follows:
1. Soak for 15 min at 50° C.
2. 50° C. to 250° C. at a ramp rate of 13.3° C./min
3. 250° C. to 535° C. at a ramp rate of 3.85° C./min
4. 535° C. to 550° C. at a ramp rate of 0.25° C./min 5. Soak for 2 hours at 550° C.

The resulting CMS fibers were tested in a single fiber module. Hollow fibers are epoxied into laboratory-scale membrane modules for permeation tests. A typical module is shown in FIG. 11. The detailed protocol for module making was documented by Koros et al. in U.S. Pat. No. 6,565,631, the contents of which are hereby incorporated by reference. The number of fibers required for a membrane module was determined by the membrane transport properties and testing protocol.

The testing procedures are like those described by Koros et al. in U.S. Pat. No. 6,565,631, the contents of which are hereby incorporated by reference. The measurements were taken at 35° C. using a feed on the shell side of the fiber at 50 psia with permeate at atmospheric pressure. The permeate flow rate was measured from the bore side with a bubble flowmeter at atmospheric pressure. The permeance (P/l) can be calculated using the following equation:

$$\frac{P}{l} = 10^{-6} \cdot \frac{Q_p \cdot 273.15}{A \cdot T \cdot \Delta p \cdot 5.17}$$

where Qp is the permeate flow rate in mL/sec, A is the active membrane area in $cm^2$, T is the room temperature in Kelvin, $\Delta p$ is the transmembrane pressure difference in psia. The calculated permeance is in "Gas Permeation Units" (GPU) defined as:

$$1 \text{ GPU} = 1 \times 10^{-6} \frac{cm^3 (stp)}{cm^2 \cdot s \cdot cmHg}$$

The permeance of $CO_2$ through the CMS fibers was measured to be 22-26 GPU. The $CO_2/CH_4$ selectivity was determined to be 60-64. The low permeance is caused by the collapse of the entire fiber wall during pyrolysis, as shown in the SEM image in FIGS. 12(C) & (D). Since the intrinsic $CO_2$ permeability of Matrimid® 5218 derived CMS is 535 Barrers (1 Barrer=$10^{-10}$ $(cm^3(stp)cm)/(cm^2 \cdot s \cdot cmHg)$, the l=P/(P/l)=535/24=24 μm, roughly corresponding to total collapse of original porous wall. FIG. 12 shows SEM images of (A) and (B): cross section of Matrimid® 5218 precursor fiber, (C) and (D): cross section of CMS fiber from Matrimid® 5218 precursor.

Example 2

Asymmetric dual-layer hollow fiber membranes were formed by a modified dry-jet/wet-quench spinning process such as that reported in U.S. Pat. No. 9,067,0180B2. This dual-layer fiber comprises one sheath layer of neat 6FDA:BPDA-DAM(1:1) and one porous core layer with Matrimid® 5218 and $SiO_2$* (US3448) with a hollow bore. A bore fluid and two spinning dopes (core spinning dope and sheath spinning dope) were used to spin 6FDA:BPDA-DAM(1:1)/($SiO_2$* (US3448)+Matrimid® 5218) dual-layer fiber membranes. The core spinning dope contained Matrimid® 5218, solvent, and $SiO_2$* (US3448) particles. N-Methyl-2-pyrrolidone (NMP) was used as solvent. The sheath spinning dope contained 6FDA:BPDA-DAM(1:1), solvents (NMP and THF), and nonsolvent (ethanol). Table 8 shows the composition of the core and sheath dopes. Table 9 shows the spinning parameters.

TABLE 8

Dope composition of core spinning dope and sheath spinning dope to spin 6FDA:BPDA-DAM(1:1)/($SiO_2$* (US3448) + Matrimid ® 5218) dual-layer fiber membranes.

Dope Composition

| Component | Core dope Mass (g) | Sheath dope Mass (g) |
|---|---|---|
| Polymer | 120 (Matrimid ® 5218) | 20 6FDA:BPDA-DAM(1:1) |
| NMP | 310 | 47.5 |
| THF | 0 | 16 |
| $LiNO_3$ | 0 | 10 |
| EtOH | 0 | 6.5 |
| $SiO_2$* (US3448) | 40 | 0 |

TABLE 9

Spinning conditions for 6FDA:BPDA-DAM(1:1)/($SiO_2$* (US3448) + Matrimid ® 5218) dual-layer fiber membranes.

| Spinning parameter | Value |
|---|---|
| Sheath dope flow rate | 18 ml/hr |
| Core dope flow rate | 180 ml/hr |
| Bore fluid flow rate | 60 ml/hr |
| Bore fluid composition | 90 wt %/10 wt % NMP/$H_2O$ |
| Take-up rate | 5 m/min |
| Quench bath temperature | 50° C. |
| Spinneret temperature | 65° C. |
| Air gap height | 10 cm |

After spinning, the fibers were soaked in water baths for 3 days to remove the last traces of solvent. The fibers were then solvent exchanged in glass containers with three separate 20 min methanol baths followed by three separate 20 min hexane baths and dried under vacuum at 75° C. for 3 hrs.

The precursor hollow fiber membranes were placed on a stainless steel wire mesh and held in place by wrapping a length of wire around the mesh and fibers. The mesh support containing the fibers was then loaded to a pyrolysis setup. Pyrolysis was performed under an atmosphere of ultra-high purity argon (99.9% pure) as follows:
1. Soak for 15 min at 50° C.
2. 50° C. to 250° C. at a ramp rate of 13.3° C./min
3. 250° C. to 535° C. at a ramp rate of 3.85° C./min
4. 535° C. to 550° C. at a ramp rate of 0.25° C./min
5. Soak for 2 hours at 550° C.

The resulting CMS fibers were tested using a pure gas feed $CO_2$ (or $CH_4$) at a pressure of 50 psi (pounds per square inch). The temperature was maintained at 35° C. The permeance of $CO_2$ through the CMS fibers was measured to be 214-218 GPU, more than an 800% increase over an otherwise equivalent asymmetric multilayer CMS fiber membrane from neat Matrimid® 5218 precursor fiber. This surprising and highly attractive result illustrates large increases in permeance compared to a collapsed asymmetric fiber based on the Matrimid® 5218 used in Comparative Example 6. The $CO_2/CH_4$ selectivity was determined to be about 49 to 54. This selectivity is commensurate with dense CMS film formed from the much more costly pure 6FDA:BPDA-DAM(1:1) precursor. FIG. 13 shows SEM images of (A) and (B): cross section of 6FDA:BPDA-DAM(1:1)/($SiO_2$* (US3448)+Matrimid® 5218) precursor fiber, (C) and (D): cross section of CMS fiber from 6FDA:BPDA-DAM(1:1)/($SiO_2$* (US3448)+Matrimid® 5218) precursor.

FIG. 14 demonstrates the good mechanical property of dual layer CMS fiber membranes from 6FDA:BPDA-DAM (1:1)/(SiO$_2$* (US3448)+Matrimid® 5218) dual-layer precursor fiber. The flexible CMS fiber can be bent to a small circle, close to a quarter dollar coin. The surprisingly good mechanical properties demonstrated by the dual layer CMS fiber is another surprising positive aspect, despite the presence of rigid SiO$_2$ nanoparticles in the non-collapsed core layer. FIG. 14 shows good flexibility of a CMS fiber membrane from 6FDA:BPDA-DAM(1:1)/(SiO$_2$* (US3448)+Matrimid® 5218) precursor fiber with 25 wt % SiO$_2$* (US3448) loading.

Besides the advantage of increasing the gas permeance of the asymmetric multilayer CMS hollow fiber membrane by limiting collapse of pores during pyrolysis, significant cost savings are possible in some embodiments disclosed herein. Example 2 shows that a more costly, but intrinsically higher performance polymer can be economically used as a sheath layer by using a lower cost core polymer layer containing the nanoparticle stabilizing fillers, which would otherwise collapse during pyrolysis.

Example 3

Asymmetric dual-layer composite hollow fiber membranes were formed via a dry-jet/wet-quench spinning process such as in Example 2. This dual-layer fiber includes one sheath layer of neat Matrimid® 5218 and one porous core layer with Matrimid® 5218 and SiO$_2$* (US3448). Two spinning dopes (core spinning dope and sheath spinning dope) were used to spin Matrimid® 5218/(SiO$_2$* (US3448)+Matrimid® 5218) dual-layer fiber membranes. The core spinning dope contained Matrimid® 5218, solvent, and SiO$_2$* (US3448) particles. N-Methyl-2-pyrrolidone (NMP) was used as solvent. The sheath spinning dope contained Matrimid® 5218, solvents (NMP and THF), and nonsolvent (ethanol). Table 10 shows the composition of these two dopes.

TABLE 10

Dope composition of core spinning dope and sheath spinning dope to spin Matrimid ® 5218/(SiO$_2$* (US3448) + Matrimid ® 5218) dual-layer fiber membranes.
Dope Composition

| Component | Core dope Mass (g) | Sheath dope Mass (g) |
| --- | --- | --- |
| Polymer | 120 (Matrimid ® 5218) | 26.2 (Matrimid ® 5218) |
| NMP | 310 | 53 |
| THF | 0 | 5.9 |
| LiNO$_3$ | 0 | 0 |
| EtOH | 0 | 14.9 |
| SiO$_2$* (US3448) | 40 | 0 |

Spinning conditions, solvent exchange and fiber pyrolysis were prepared as in Example 2. The resulting CMS fibers were tested using a pure gas feed CO$_2$ (or CH$_4$) at a pressure of 50 psi (pounds per square inch). The temperature was maintained at 35° C. The permeance of CO$_2$ through the CMS fibers was measured to be 162-166 GPU, a 600% increase over an otherwise equivalent asymmetric multilayer CMS fiber membrane from neat Matrimid® 5218 precursor fiber. The CO$_2$/CH$_4$ selectivity was determined to be 53-57. This is within 88% of the selectivity of a dense film CMS of the Matrimid® 5218 precursor pyrolyzed under similar condition. This example illustrates that it is possible to use only a single relatively lower cost polymer to achieve selectivity equal to or higher than for a high cost sheath layer polymer. Another aspect illustrated in this example is the surprisingly high permeance (162-166 GPU) achievable with the use of the same polymer used as a single layer fiber with no silica nanoparticles (Comparative Example 6). The same excellent mechanical properties shown for the CMS fiber in Example 2 also were found for the CMS fiber in this Example. FIG. 15 shows SEM images of (A) and (B): cross section of Matrimid® 5218/(SiO$_2$* (US3448)+Matrimid® 5218) precursor fiber, (C) and (D): cross section of CMS fiber from Matrimid® 5218/(SiO$_2$* (US3448)+Matrimid® 5218) precursor.

Example 4

Asymmetric dual-layer dual layer hollow fiber membranes were formed via a dry-jet/wet-quench spinning process such as in Example 2. This dual-layer fiber is comprised of one sheath layer of neat Matrimid® 5218 and one porous core layer with 6FDA-DAM and SiO$_2$*(US3448). Two spinning dopes (core spinning dope and sheath spinning dope) were used to spin Matrimid® 5218/(SiO$_2$* (US3448)+6FDA-DAM) dual-layer fiber membranes. The core spinning dope contained 6FDA-DAM, solvent, and SiO$_2$* (US3448) particles. N-Methyl-2-pyrrolidone (NMP) was used as solvent. The sheath spinning dope contained 6FDA-DAM, solvents (NMP and THF), and nonsolvent (ethanol). Table 11 shows the composition of these two dopes.

TABLE 11

Dope composition of core spinning dope and sheath spinning dope to spin Matrimid ® 5218/(SiO$_2$* (US3448) + 6FDA-DAM) dual-layer fiber membranes.
Dope Composition

| Component | Core dope Mass (g) | Sheath dope Mass (g) |
| --- | --- | --- |
| Polymer | 120 (6FDA-DAM) | 26.2 (Matrimid ® 5218) |
| NMP | 310 | 53 |
| THF | 0 | 5.9 |
| LiNO$_3$ | 0 | 0 |
| EtOH | 0 | 14.9 |
| SiO$_2$* (US3448) | 40 | 0 |

Spinning conditions, solvent exchange and fiber pyrolysis were prepared as in Example 2. The resulting CMS fibers were tested using a pure gas feed CO$_2$ (or CH$_4$) at a pressure of 50 psi (pounds per square inch). The temperature was maintained at 35° C. The permeance of CO$_2$ through the CMS fibers was measured to be 166-170 GPU. The CO$_2$/CH$_4$ selectivity was determined to be 52-56. This is within 88% of the selectivity of a dense film CMS of the Matrimid® 5218 precursor pyrolyzed under similar condition. This demonstrated the excellent properties and the good adhesion between two layers of different polymer precursors during pyrolysis. This illustrates another aspect of the invention in which a higher T$_g$ (6FDA-DAM, T$_g$=395° C.) core polymer with appropriate SiO$_2$ particles can be used to support a lower T$_g$ (Matrimid® 5218, T$_g$=305° C.) pure sheath polymer, followed by pyrolysis to form a high permeance, high selectivity CMS asymmetric composite fiber with non-collapsed support layer. As in Example 2, the resultant CMS fiber showed the excellent mechanical properties illustrated in FIG. 14. In addition, FIG. 16 shows SEM images of (A) and (B): cross section of Matrimid® 5218/ (SiO$_2$* (US3448)+6FDA-DAM) precursor fiber, (C) and (D): cross section of CMS fiber Matrimid® 5218/(SiO$_2$* (US3448)+6FDA-DAM) precursor.

Comparative Example 7

Asymmetric dual-layer hollow fiber membranes were formed via a dry-jet/wet-quench spinning process such as in Example 2. This dual-layer fiber is comprised of one core layer of neat 6FDA:BPDA-DAM (1:1) and one sheath layer of neat Matrimid® 5218. Two spinning dopes (core spinning dope and sheath spinning dope) were used to spin Matrimid® 5218/6FDA:BPDA-DAM(1:1) dual-layer fiber membranes. The core spinning dope contained 6FDA:BPDA-DAM (1:1) and solvent N-Methyl-2-pyrrolidone (NMP). The sheath spinning dope contained Matrimid® 5218, solvents (NMP and THF), and nonsolvent (ethanol). Table 12 shows the composition of these two dopes.

TABLE 12

Dope composition of core spinning dope and sheath spinning dope to spin dual layer 6FDA:BPDA-DAM(1:1)/Matrimid ® 5218 dual-layer fiber membranes.

Dope Composition

| Component | Core dope Mass (g) | Sheath dope Mass (g) |
| --- | --- | --- |
| Polymer | 100 6FDA:BPDA-DAM(1:1) | 26.2 (Matrimid ® 5218) |
| NMP | 300 | 53 |
| THF | 0 | 5.9 |
| LiNO$_3$ | 0 | 0 |
| EtOH | 0 | 14.9 |

Spinning conditions, solvent exchange and fiber pyrolysis were prepared as in Example 2. The resulting CMS fibers were tested as described in Comparative Example 6. The permeance of CO$_2$ through the CMS fibers was measured to be about 95 to 99 GPU. The CO$_2$/CH$_4$ selectivity was determined to be about 52 to 56. This is within 88% of the selectivity of a dense film CMS of the Matrimid® 5218 precursor pyrolyzed under similar condition. 6FDA:BPDA-DAM (1:1) was chosen as core layer precursor polymer due to its high glass-rubber transition temperature. The increased glass-rubber transition temperature resulted in high rigidity during intense heat-treatments and finally led to improved asymmetric morphology of CMS fibers. This fact notwithstanding, FIG. 17 shows there is still considerable amount of densification in membrane. 6FDA polyimide polymers are ten times more costly than Matrimid® 5218. It is more economical to use Matrimid® 5218 or other low-cost polymer in the core layer. This example also shows that even using the more expensive higher T$_g$ core polymer without appropriately selected nanoparticles, the resultant CMS composite fiber permeance is lower (95-99 GPU) than when the low cost polymer with nanoparticles is used in the core (162-166 GPU) with the same low cost polymer in the sheath (Example 3). Moreover, the resultant permeance is much lower than achievable using the more costly 6FDA:BPDA-DAM(1:1) sheath polymer on a less costly core polymer with appropriately selected nanoparticles (Example 2, 214-218 GPU). FIG. 17 shows SEM images of (A) and (B): cross section of Matrimid® 5218/6FDA:BPDA-DAM (1:1) precursor fiber, (C) and (D): cross section of CMS fiber Matrimid® 5218/6FDA:BPDA-DAM(1:1) precursor.

Comparative Example 8

Asymmetric dual-layer hollow fiber membranes were formed via a dry-jet/wet-quench spinning process such as in Example 2. This dual-layer fiber is comprised of one sheath layer of neat Matrimid® 5218 and one porous core layer with Matrimid® 5218 and SiO$_2$ (C803). Two spinning dopes (core spinning dope and sheath spinning dope) were used to spin Matrimid® 5218/(SiO$_2$(C803)+Matrimid® 5218) dual-layer fiber membranes. The core spinning dope contained Matrimid® 5218, solvent, and SiO$_2$(C803) particles. N-Methyl-2-pyrrolidone (NMP) was used as solvent. The sheath spinning dope contained Matrimid® 5218, solvents (NMP and THF), and nonsolvent (ethanol). Table 13 shows the composition of these two dopes.

TABLE 13

Dope composition of core spinning dope and sheath spinning dope to spin dual layer Matrimid ® 5218/(SiO$_2$ (C803) + Matrimid ® 5218) dual-layer fiber membranes.

Dope Composition

| Component | Core dope Mass (g) | Sheath dope Mass (g) |
| --- | --- | --- |
| Polymer | 120 (Matrimid ® 5218) | 26.2 (Matrimid ® 5218) |
| NMP | 310 | 53 |
| THF | 0 | 5.9 |
| LiNO$_3$ | 0 | 0 |
| EtOH | 0 | 14.9 |
| SiO$_2$(C803) | 40 | 0 |

Spinning conditions, solvent exchange and fiber pyrolysis were prepared as in Example 2. The resulting CMS fibers were tested as described in Comparative Example 6. The permeance of CO$_2$ through the CMS fibers was measured to be about 15002 to 15118 GPU. The CO$_2$/CH$_4$ selectivity was determined to be about 1.1 to 1.2. Even though SiO$_2$ (C803) is a very good morphology stabilizer in the core layer during pyrolysis, the large particles can easily damage the sheath layer of the fiber, making the CMS fibers non-selective, as shown in FIG. 18. FIG. 18 shows SEM images of (A) and (B): cross section of Matrimid® 5218/(SiO$_2$(C803)+ Matrimid® 5218) precursor fiber, (C) and (D): cross section of CMS fiber Matrimid® 5218/(SiO$_2$(C803)+Matrimid® 5218) precursor. This comparative example illustrates another aspect of the current invention regarding the importance of selection of the appropriate particle type for inclusion in the core layer (as shown in Example 3).

The testing results of the above Examples are summarized in Table 14.

TABLE 14

Summary of the testing results.

| | P (CO$_2$) [GPU] | α$_{CO2/CH4}$ |
| --- | --- | --- |
| CMS of untreated Matrimid ® 5218, Comparative Example 6 (Pyrolysis Temperature 550° C.) | 22-26 | 60-64 |
| CMS of 6FDA:BPDA-DAM(1:1)/(SiO$_2$* (US3448) + Matrimid ® 5218), Example 2 (Pyrolysis Temperature 550° C.) | 214-218 | 49-54 |
| CMS of Matrimid ® 5218/(SiO$_2$* (US3448) + Matrimid ® 5218), Example 3 (Pyrolysis Temperature 550° C.) | 162-166 | 53-57 |
| CMS of Matrimid ® 5218/(SiO$_2$* (US3448) + 6FDA-DAM), Example 4 (Pyrolysis Temperature 550° C.) | 166-170 | 52-56 |
| CMS of Matrimid ® 5218/6FDA:BPDA-DAM(1:1), Comparative Example 7 (Pyrolysis Temperature 550° C.) | 95-99 | 52-56 |

TABLE 14-continued

Summary of the testing results.

| | P (CO$_2$) [GPU] | $\alpha_{CO2/CH4}$ |
|---|---|---|
| CMS of Matrimid ® 5218/(SiO$_2$ (C803) + Matrimid ® 5218), Comparative Example 8 (Pyrolysis Temperature 550° C.) | 15002-15118 | 1.1-1.2 |

As demonstrated by the above Examples, polymer precursor with appropriate nanoparticles in the core can be used to create highly attractive composite CMS membranes when proper selection of the core precursors with appropriate nanoparticles in the core layer. In various embodiments, the nanoparticle stabilized fiber cores were selected to obtain an asymmetric multilayer CMS hollow fiber membrane having a gas permeance that is at least a 300% increase over an otherwise equivalent asymmetric multilayer CMS hollow fiber membrane that does not include nanoparticle in the core layer. In various embodiments, the nanoparticle stabilized fiber cores are selected to obtain an asymmetric multilayer CMS hollow fiber membrane having a gas permeance that is at least a 400% increase over an otherwise equivalent asymmetric multilayer CMS hollow fiber membrane that does not contain nanoparticles in the core layer. In various embodiments, the nanoparticle stabilized fiber cores allow obtaining an asymmetric multilayer CMS hollow fiber membrane having a gas permeance that is at least a 600% increase over an otherwise equivalent asymmetric multilayer CMS hollow fiber membrane that does not include nanoparticles in the core layer. In various embodiments, the nanoparticle stabilized fiber cores enable formation of an asymmetric multilayer CMS hollow fiber membrane having a gas permeance that is at least a 800% increase over an otherwise equivalent asymmetric multilayer CMS hollow fiber membrane that does not include nanoparticles in the core layer.

As demonstrated by the above Examples, a substantial increase in permeance may be brought about without also causing a substantial loss in selectivity. For example, in various embodiments, the nanoparticle stabilized fiber cores can be selected to obtain an asymmetric multilayer CMS hollow fiber membrane having a selectivity that is at least 80% of the selectivity of an otherwise equivalent asymmetric multilayer CMS hollow fiber membrane that does not include nanoparticles in the core layer. In various embodiments, nanoparticle stabilized fiber cores can be selected to obtain an asymmetric multilayer CMS hollow fiber membrane having a selectivity that is at least 85% of the selectivity of an otherwise equivalent asymmetric multilayer CMS hollow fiber membrane that does not include nanoparticles in the core layer. In various embodiments, the nanoparticle stabilized fiber cores can be selected to obtain an asymmetric multilayer CMS hollow fiber membrane having a selectivity that is at least 90% of the selectivity of an otherwise equivalent asymmetric multilayer CMS hollow fiber membrane that does not include nanoparticles in the core layer. In various embodiments, nanoparticle stabilized fiber cores can be selected to obtain an asymmetric multilayer CMS hollow fiber membrane having a selectivity that is at least 95% of the selectivity of an otherwise equivalent asymmetric multilayer CMS hollow fiber membrane does not contain nanoparticle stabilized fiber cores.

In various embodiments, the nanoparticle stabilized fiber cores are selected to obtain an asymmetric multilayer CMS hollow fiber membrane having a desired combination of gas permeance and selectivity properties. For example, the nanoparticle stabilized fiber cores may be selected to obtain an asymmetric multilayer CMS hollow fiber membrane having properties that are useful for the separation of $CO_2$ and $CH_4$ within a gas stream comprising any number of additional constituents. Alternatively, the nanoparticle stabilized fiber cores may be selected to obtain an asymmetric multilayer CMS hollow fiber membrane that is useful for the separation of $H_2S$ and $CH_4$ within a gas stream comprising any number of additional constituents. Alternatively, the nanoparticle stabilized fiber cores may be selected to obtain an asymmetric multilayer CMS hollow fiber membrane that is useful for the separation of a mixture of $CO_2$ and $H_2S$ ($CO_2/H_2S$) from $CH_4$ within a gas stream comprising any number of additional constituents. Alternatively, the nanoparticle stabilized fiber cores may be selected to obtain an asymmetric multilayer CMS hollow fiber membrane that is useful for the separation of $CO_2$ and $N_2$ within a gas stream comprising any number of additional constituents. Alternatively, the nanoparticle stabilized fiber cores may be selected to obtain an asymmetric multilayer CMS hollow fiber membrane that is useful for the separation of $O_2$ and $N_2$ within a gas stream comprising any number of additional constituents. Alternatively, nanoparticle stabilized fiber cores may be selected to obtain an asymmetric multilayer CMS hollow fiber membrane that is useful for the separation of $N_2$ and $CH_4$ within a gas stream comprising any number of additional constituents. Alternatively, the nanoparticle stabilized fiber cores may be selected to obtain an asymmetric multilayer CMS hollow fiber membrane that is useful for the separation of He and $CH_4$ within a gas stream comprising any number of additional constituents. Alternatively, the nanoparticle stabilized fiber cores may be selected to obtain an asymmetric multilayer CMS hollow fiber membrane that is useful for the separation of $H_2$ and $CH_4$ within a gas stream comprising any number of additional constituents. Alternatively, the nanoparticle stabilized fiber cores may be selected to obtain an asymmetric multilayer CMS hollow fiber membrane that is useful for the separation of $H_2$ and $C_2H_4$ within a gas stream comprising any number of additional constituents. Alternatively, the nanoparticle stabilized fiber cores may be selected to obtain an asymmetric multilayer CMS hollow fiber membrane that is useful for the separation of olefins from paraffins, such as the separation of ethylene and ethane or propylene and propane within a gas stream comprising any number of additional constituents. nanoparticle stabilized fiber cores may also be selected to obtain an asymmetric multilayer CMS hollow fiber membrane that is useful for the separation of a mixture of olefins from a mixture of paraffins, such as a mixture of ethylene and propylene (ethylene/propylene) from a mixture of ethane and propane (ethane/propane) within a gas stream comprising any number of additional constituents.

In various embodiments, the nanoparticle stabilized fiber cores may be selected to obtain an asymmetric multilayer CMS hollow fiber membrane having desirable permeance and selectivity properties, such as may be determined by testing the asymmetric multilayer CMS hollow fiber membrane in a single fiber module using a constant-volume variable pressure permeation system such as the one described by Koros et al. in U.S. Pat. No. 6,565,631.

For example, nanoparticle stabilized fiber cores may be selected to obtain an asymmetric multilayer CMS hollow fiber membrane having properties that are desirable for the separation of $CO_2$ and $CH_4$, the nanoparticle stabilized fiber cores may be selected to obtain an asymmetric multilayer CMS hollow fiber membrane having a $CO_2$ permeance of at least 200 GPU and a $CO_2/CH_4$ selectivity of at least 50 when subjected to pure gas feed $CO_2$ (or $CH_4$) at 50 psi and 35° C. Alternatively, the nanoparticle stabilized fiber cores may be selected to obtain an asymmetric multilayer CMS hollow fiber membrane having a $CO_2$ permeance of at least 60 GPU and a $CO_2/CH_4$ selectivity of at least 80 for pyrolysis under higher temperature conditions when subjected to pure gas feed $CO_2$ (or $CH_4$) at 50 psi and 35° C.

In another embodiment, the nanoparticle stabilized fiber cores may be selected to obtain an asymmetric multilayer CMS hollow fiber membrane that is useful for the separation of acid gases, such as $CO_2$ and $H_2S$, from a gas stream that contains or is rich in hydrocarbons, such as a natural gas stream Although the above examples show the manner in which nanoparticle stabilized fiber cores may be selected to obtain an asymmetric multilayer CMS hollow fiber membrane having properties that are desirable for the separation of $CO_2$ and $CH_4$, it will be understood by a person of ordinary skill in the art that by testing asymmetric multilayer CMS hollow fiber membranes prepared using nanoparticle stabilized fiber cores and pyrolysis temperatures for the separation of any gas stream, one may readily determine the nanoparticle stabilized fiber cores and the pyrolysis temperature that produces an asymmetric multilayer CMS hollow fiber membrane that is particularly desirable for separation of any gas stream.

Asymmetric multilayer CMS hollow fiber membranes

Various embodiments are directed to an asymmetric multilayer CMS hollow fiber membrane having nanoparticle stabilized fiber cores in which the nanoparticle is itself porous. In this case, for which the nanoparticle stabilizing filler is porous, the flow of gas through the CMS hollow fiber membrane core may be promoted and the weight of the fiber can also be reduced.

Examples 5 to 68

The procedure of Example 2 can be carried out using a number of different precursor polymers for sheath and core layers. As noted, additional polymers contemplated for use include:
P1. 6FDA:BPDA-DAM
P2. Matrimid® 5218
P3. 6FDA:DSDA-DAM
P4. 6FDA:DAM-DABA 3:2
As noted, suitable nanoparticle stabilizing fillers may include
NP1. 15 nm $SiO_2$*, 0.056 g/cm³ (Product # US3448, US Research Nanomatertials, Inc.)
NP2. POSS-silica, for example (a) Aminopropyllsooctyl POSS (Product #M0270, Hybrid Plastics), (b) OctaTrimethylsiloxy POSS (Product # MS0865, Hybrid Plastics).
NP3. Nitride
NP4. Carbide

| Example No. | Sheath Precursor Polymer | Nanoparticle Stabilizing Filler | Core Precursor Polymer |
|---|---|---|---|
| 5 | P1 | NP1 | P1 |
| 6 | P1 | NP1 | P2 |
| 7 | P1 | NP1 | P3 |
| 8 | P1 | NP1 | P4 |
| 9 | P1 | NP2 | P1 |
| 10 | P1 | NP2 | P2 |
| 11 | P1 | NP2 | P3 |
| 12 | P1 | NP2 | P4 |
| 13 | P1 | NP3 | P1 |
| 14 | P1 | NP3 | P2 |
| 15 | P1 | NP3 | P3 |
| 16 | P1 | NP3 | P4 |
| 17 | P1 | NP4 | P1 |
| 18 | P1 | NP4 | P2 |
| 19 | P1 | NP4 | P3 |
| 20 | P1 | NP4 | P4 |
| 21 | P2 | NP1 | P1 |
| 22 | P2 | NP1 | P2 |
| 23 | P2 | NP1 | P3 |
| 24 | P2 | NP1 | P4 |
| 25 | P2 | NP2 | P1 |
| 26 | P2 | NP2 | P2 |
| 27 | P2 | NP2 | P3 |
| 28 | P2 | NP2 | P4 |
| 29 | P2 | NP3 | P1 |
| 30 | P2 | NP3 | P2 |
| 31 | P2 | NP3 | P3 |
| 32 | P2 | NP3 | P4 |
| 33 | P2 | NP4 | P1 |
| 34 | P2 | NP4 | P2 |
| 35 | P2 | NP4 | P3 |
| 36 | P2 | NP4 | P4 |
| 37 | P3 | NP1 | P1 |
| 38 | P3 | NP1 | P2 |
| 39 | P3 | NP1 | P3 |
| 40 | P3 | NP1 | P4 |
| 41 | P3 | NP2 | P1 |
| 42 | P3 | NP2 | P2 |
| 43 | P3 | NP2 | P3 |
| 44 | P3 | NP2 | P4 |
| 45 | P3 | NP3 | P1 |
| 46 | P3 | NP3 | P2 |
| 47 | P3 | NP3 | P3 |
| 48 | P3 | NP3 | P4 |
| 49 | P3 | NP4 | P1 |
| 50 | P3 | NP4 | P2 |
| 51 | P3 | NP4 | P3 |
| 52 | P3 | NP4 | P4 |
| 53 | P4 | NP1 | P1 |
| 54 | P4 | NP1 | P2 |
| 55 | P4 | NP1 | P3 |
| 56 | P4 | NP1 | P4 |
| 57 | P4 | NP2 | P1 |
| 58 | P4 | NP2 | P2 |
| 59 | P4 | NP2 | P3 |
| 60 | P4 | NP2 | P4 |
| 61 | P4 | NP3 | P1 |
| 62 | P4 | NP3 | P2 |
| 63 | P4 | NP3 | P3 |
| 64 | P4 | NP3 | P4 |
| 65 | P4 | NP4 | P1 |
| 66 | P4 | NP4 | P2 |
| 67 | P4 | NP4 | P3 |
| 68 | P4 | NP4 | P4 |

The described embodiments provide unique and novel treatment processes, asymmetric multilayer CMS hollow fiber membranes, thermally re-arranged polymer membranes, and methods of using the membranes that have a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

Also, in describing the exemplary embodiments, specific terminology will be resorted to for the sake of clarity. It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents that operate in a similar manner to accomplish a similar purpose.

As used herein, "substantially free" of something, or "substantially pure", and like characterizations, can include both being "at least substantially free" of something, or "at least substantially pure", and being "completely free" of something, or "completely pure." By comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the present invention are intended to be illustrative and not restrictive. Many suitable materials that would perform the same or a similar function as the materials described herein are intended to be embraced within the scope of the present invention. Such other materials not described herein can include, but are not limited to, for example, materials that are developed after the time of the development of the present invention.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

The invention claimed is:

1. A process for preparing an asymmetric multilayer carbon molecular sieve (CMS) hollow fiber membrane comprising
   a. co-extruding a core dope and a sheath dope through a spinneret to produce at least one multilayer CMS membrane precursor fiber,
      wherein the core dope comprises a first polymer, a first solvent, and a plurality of nanoparticles, and
      wherein the sheath dope comprises a second polymer and a second solvent; and
   b. pyrolyzing the at least one multilayer CMS membrane precursor fiber to form an asymmetric multilayer CMS hollow fiber membrane.

2. The process of claim 1, wherein the first and second polymers are the same polymer.

3. The process of claim 1, wherein the first and second polymers are different polymers.

4. The process of claim 3, wherein the first polymer has a glass transition temperature and the second polymer has a glass transition temperature that is equal to or greater than the glass transition temperature of the first polymer.

5. The process of claim 3, wherein the first polymer has a glass transition temperature and the second polymer has a glass transition temperature that is equal to or lower than the glass transition temperature of the first polymer.

6. The process of claim 1 wherein the plurality of nanoparticles in the core dope are hydrophobic.

7. The process of claim 1 wherein the plurality of nanoparticles in the core dope are polyhedral oligomeric silsesquioxane ("POSS") silica nanoparticles.

8. The process of claim 1, wherein the at least one CMS membrane precursor fiber comprises a core layer comprising the extruded core dope and a sheath layer comprising the extruded sheath dope, the core layer having a substantially annular cross-section and the sheath layer having a substantially annular cross-section adjacent to and radially outward from the core layer, and wherein the core layer comprises 25-40 wt % nanoparticles based on polymer weight.

9. The process of claim 1, wherein the at least one CMS membrane precursor fiber comprises a core layer comprising the extruded core dope and a sheath layer comprising the extruded sheath dope, the core layer having a substantially annular cross-section and the sheath layer having a substantially annular cross-section adjacent to and radially outward from the core layer, and wherein the core layer comprises 10-25 wt % nanoparticles based on polymer weight.

10. The process of claim 1, further comprising prior to pyrolyzing the CMS hollow fiber membrane precursor, contacting the CMS hollow fiber membrane precursor with one or more solvent exchange materials comprising a modifying agent in an amount effective to improve the gas permeance of the asymmetric multilayer CMS hollow fiber membrane.

11. The process of claim 10, wherein the modifying agent is a silane.

12. A process for preparing a multilayer hollow fiber membrane comprising:
   a. co-extruding a core dope and a sheath dope through a spinneret to produce at least one multilayer hollow fiber membrane precursor,
      wherein the core dope comprises a first polymer, a first solvent, and a plurality of nanoparticles, and
      wherein the sheath dope comprises a second polymer and a second solvent, wherein the second polymer is a thermally rearrangable polymer; and
   b. heating the multilayer hollow fiber membrane precursor at a temperature of between about 270° C. and about 450° C. for a period of about 1 to 4 hours to form an asymmetric composite thermally rearranged hollow fiber membrane.

13. The process of claim 12, wherein the thermally rearrangable polymer is selected from the group consisting of polybenzoxazoles, polybenzothiazoles, polybenzimidazoles, and combinations.

14. An asymmetric multilayer CMS hollow fiber membrane comprising
   a. a core layer comprising a pyrolyzed first polymer and a plurality of nanoparticles, wherein the core layer has a substantially annular cross-section; and b. a sheath layer comprising a pyrolyzed second polymer, wherein the sheath layer has a substantially annular cross-section and is adjacent to and radially outward from the core layer.

15. The asymmetric multilayer CMS hollow fiber membrane of claim 14,
wherein the asymmetric multilayer CMS hollow fiber membrane comprises a gas permeance at least 300% greater than a gas permeance of an otherwise equivalent asymmetric multilayer CMS hollow fiber membrane that does not include nanoparticles in the core layer; or
wherein the asymmetric multilayer CMS hollow fiber membrane comprises a selectivity that is at least 85% of the selectivity of an otherwise equivalent asymmetric multilayer CMS hollow fiber membrane that that does not include nanoparticles in a core layer.

16. The asymmetric multilayer CMS hollow fiber membrane of claim 14,
wherein the asymmetric multilayer CMS hollow fiber membrane comprises a $CO_2$ permeance of at least 50 GPU and a $CO_2/CH_4$ selectivity of at least 60 when subjected to a mixed feed containing 50 mol % $CO_2$ and 50 mol % $CH_4$ at 150 psi and 35° C.; or
wherein the asymmetric multilayer CMS hollow fiber membrane comprises a $O_2$ permeance of at least 80 GPU and a $O_2/N_2$ selectivity of at least 9 when subjected to a single gas feed at 50 psi and 70° C.; or
wherein the asymmetric multilayer CMS hollow fiber membrane comprises a $C_2H_4$ permeance of at least 5 GPU and a $C_2H_4/C_2H_6$ selectivity of at least 4 when subjected to a single gas feed at 100 psi and 35° C.; or
wherein the asymmetric multilayer CMS hollow fiber membrane comprises a $C_3H_8$ permeance of at least 5 GPU and a $C_3H_6/C_3H_8$ selectivity of at least 20 when subjected to a mixed feed containing 50 mol % $C_3H_6$ and 50 mol % $C_3H_8$ at 100 psi and 35° C.

17. A process for separating a mixture of at least two gases comprising contacting the mixture of gases with the asymmetric multilayer CMS hollow fiber membrane of claim 14 to separate the mixture into a permeate stream that is enriched in a first gas and a retentate stream that is enriched in a second gas.

18. The process of claim 17, wherein the mixture of at least two gases comprises $CO_2$ and $CH_4$; $H_2S$ and $CH_4$; $CO_2$, $H_2S$, and $CH_4$; $CO_2$ and $N_2$; $O_2$ and $N_2$; $N_2$ and $CH_4$; He and $CH_4$; $H_2$ and $CH_4$; $H_2$ and $C_2H_4$; ethylene and ethane; propylene and propane; or ethane/propane and ethylene/propylene.

19. The process of claim 17, wherein the mixture of at least two gases comprises acid gases and natural gases.

20. The process of claim 17, wherein the mixture of at least two gases comprises $CO_2$ and at least one hydrocarbon, and wherein the permeate stream is enriched in $CO_2$.

* * * * *